United States Patent
Tamerler-Behar et al.

(10) Patent No.: US 12,533,444 B2
(45) Date of Patent: Jan. 27, 2026

(54) MITIGATION OF PERI-IMPLANTITIS BY DESIGN AND STABILITY OF BIFUNCTIONAL PEPTIDES WITH ANTIMICROBIAL PROPERTIES

(71) Applicants: University of Kansas, Lawrence, KS (US); University of Southern California, Los Angeles, CA (US)

(72) Inventors: Candan Tamerler-Behar, Lawrence, KS (US); Emily Wisdom, Albuquerque, NM (US); Malcolm Snead, Los Angeles, CA (US)

(73) Assignees: University of Kansas, Lawrence, KS (US); University of Southern California, Los Angeles, CA (US)

( * ) Notice: Subject to any disclaimer, the term of this patent is extended or adjusted under 35 U.S.C. 154(b) by 836 days.

(21) Appl. No.: 17/641,058

(22) PCT Filed: Sep. 7, 2020

(86) PCT No.: PCT/US2020/049621
§ 371 (c)(1),
(2) Date: Mar. 7, 2022

(87) PCT Pub. No.: WO2021/046498
PCT Pub. Date: Mar. 11, 2021

(65) Prior Publication Data
US 2022/0324915 A1 Oct. 13, 2022

Related U.S. Application Data

(60) Provisional application No. 62/897,355, filed on Sep. 8, 2019.

(51) Int. Cl.
| | |
|---|---|
| *A61L 27/54* | (2006.01) |
| *A61K 6/58* | (2020.01) |
| *A61K 38/00* | (2006.01) |
| *A61L 27/22* | (2006.01) |
| *A61P 1/02* | (2006.01) |
| *A61P 31/04* | (2006.01) |
| *C07K 14/47* | (2006.01) |

(52) U.S. Cl.
CPC ............ *A61L 27/54* (2013.01); *A61K 6/58* (2020.01); *A61L 27/227* (2013.01); *A61P 1/02* (2018.01); *A61P 31/04* (2018.01); *C07K 14/4723* (2013.01); *A61K 38/00* (2013.01); *A61L 2300/252* (2013.01); *A61L 2300/404* (2013.01); *A61L 2300/606* (2013.01); *A61L 2430/12* (2013.01); *C07K 2319/20* (2013.01)

(58) Field of Classification Search
None
See application file for complete search history.

(56) References Cited

U.S. PATENT DOCUMENTS

| | | | |
|---|---|---|---|
| 5,714,467 A | 2/1998 | Boman et al. | |
| 11,492,382 B2 * | 11/2022 | Tamerler-Behar | ........................ C07K 14/4723 |

FOREIGN PATENT DOCUMENTS

WO WO-2019040517 A1 * 2/2019 ............. A61L 27/54

OTHER PUBLICATIONS

Ji et al. ("Cecropin A-melittin mutant with improved proteolytic stability and enhanced antimicrobial activity against bacteria and fungi associated with gastroenteritis in vitro," Biochemical and Biophysical Research Communications 451 (2014) 650-655) (Year: 2014).*
International Search Report and Written Opinion on PCT PCT/US2020/049621 Dtd Feb. 10, 2021, 8 pages.
Wisdom, et al., "Prevention of Medical Implant Infection through Self-Assembled Engineered Peptides as Surface Active Bio-Agents," https://kuscholarworks.ku.edu/handle/1808/30366, Dec. 16, 2019, 41 pages.
Achermann, G., et al., "How will dentistry look in 2020? In Vision 2020: Simply doing more for dental professionals", The Straumann Group: Amsterdam, 2012.
Bayramov, et al., "Beyond conventional antibiotics—New directions for combination products to combat biofilm", Adv Drug Deliv Rev, 2017, 112, p. 48-60.
Berglundh, et al., "Peri-implant diseases and conditions: Consensus report of workgroup 4 of the 2017 World Workshop on the Classification of Periodontal and Peri-Implant Diseases and Conditions", J Periodontol, 2018, p. S313-S318.
Boone, et al., "Antimicrobial peptide similarity and classification through rough set theory using physicochemical boundaries", BMC Bioinformatics, 2018, 19 (1), p. 469.
Bulheller, et al., "DichroCalc—circular and linear dichroism online", Bioinformatics, 2009, 25 (4), p. 539-540.
Caton, et al., "A new classification scheme for periodontal and peri-implant diseases and conditions—Introduction and key changes from the 1999 classification", Journal of Periodontology, 2018, 89, p. S1-S8.
Chapple, et al., "Periodontal health and gingival diseases and conditions on an intact and a reduced periodontium: Consensus report of workgroup 1 of the 2017 World Workshop on the Classification of Periodontal and Peri-Implant Diseases and Conditions", J Periodontol, 2018, 89 Suppl 1, p. S74-S84.

(Continued)

*Primary Examiner* — Christina Bradley
(74) *Attorney, Agent, or Firm* — Foley & Lardner LLP

(57) ABSTRACT

Described herein is a bifunctional peptide, compositions comprising the same, and methods useful for treatment of peri-implant disease.

6 Claims, 13 Drawing Sheets

Specification includes a Sequence Listing.

(56) References Cited

OTHER PUBLICATIONS

Chen, et al., "Antimicrobial GL13K peptide coatings killed and ruptured the wall of Streptococcus gordonii and prevented formation and growth of biofilms", PLoS One, Nov. 2014, vol. 9, No. 11, p. e111579, 8 pages . . . .
Chouirfa, et al., "Review of titanium surface modification techniques and coatings for antibacterial applications", Acta Biomater, 2019, 83, p. 37-54.
Cilia, et al., "From protein sequence to dynamics and disorder with DynaMine", Nat Commun, 2013, vol. 4, 2741, 10 pages.
Cilia, et al., "The DynaMine webserver: predicting protein dynamics from sequence", Nucleic Acids Res, 2014, 42 (Web Server issue), p. W264-W270.
Costerton, et al., "Bacterial biofilms: a common cause of persistent infections", Science, May 21, 1999, vol. 284 (5418), p. 1318-1322.
Delak, et al., "The tooth enamel protein, porcine amelogenin, is an intrinsically disordered protein with an extended molecular configuration in the monomeric form", Biochemistry, 2009, 48 (10), p. 2272-2281.
Dutzan, et al., "Dysbiotic microbiome triggers TH17 cells to mediate oral mucosal immunopathology in mice and humans", Science translational medicine 2018, 10 (463), 21 pages.
Fjell, et al., "Designing antimicrobial peptides: form follows function", Nat Rev Drug Discov, 2011, 11 (1), p. 37-51.
Godoy-Gallardo, et al., "Covalent immobilization of hLf1-11 peptide on a titanium surface reduces bacterial adhesion and biofilm formation", Acta Biomater, 2014, 10 (8), p. 3522-3534.
Gungormus, M., et al., "Cementomimetics-constructing a cementum-like biomineralized microlayer via amelogenin-derived peptides," International Journal of Oral Science, vol. 4, No. 2, pp. 69-77 (Jun. 2012).
Gungormus, M., et al., "Self Assembled Bi-Functional Peptide Hydrogels with Biomineralization-Directing Peptides", Biomaterials, 2010, 31 (28), p. 7266-7274.
Heinz, et al., "Nature of Molecular Interactions of Peptides with Gold, Palladium, and Pd—Au Bimetal Surfaces in Aqueous Solution", J Am Chem Soc, 2009, 131 (28), p. 9704-14.
Holmberg, et al., "Bio-inspired stable antimicrobial peptide coatings for Dental applications", Acta Biomater, 2013, 9 (9), p. 8224-8231.
Hvistendahl, et al., "Public Health. China takes aim at rampant antibiotic resistance", Science, May 18, 2012, vol. 336 (6083), p. 795.
Kabsch, et al., "Dictionary of protein secondary structure: pattern recognition of hydrogen-bonded and geometrical features", Biopolymers, 1983, vol. 22 (12), p. 2577-2637.
Kacar, et al., "Directed Self-Immobilization of Alkaline Phosphatase on Micro-Patterned Substrates via Genetically Fused Metal-Binding Peptide", Biotechnol Bioeng, Jul. 1, 2009, vol. 103, No. 4, p. 696-705.
Lacruz, et al., "Structural analysis of a repetitive protein sequence motif in strepsirrhine primate amelogenin", PLoS One, Mar. 2011, vol. 6, Issue 3, e18028.
Lamiable, et al., "PEP-FOLD3: faster de novo structure prediction for linear peptides in solution and in complex", Nucleic Acids Res, 2016, 44 (W1), p. W449-W454.
Lang, et al., "Biological complications with dental implants: their prevention, diagnosis and treatment", Clinical Oral Implants Research, 2000, p. 146-155.
Lopez-Piriz, R., et al., "Current state-of-the-art and future perspectives of the three main modern implant-dentistry concerns: Aesthetic requirements, mechanical properties, and peri-implantitis prevention", J Biomed Mater Res A, 107 (7), 2019, p. 1466-1475.
Maupetit, et al., "PEP-FOLD: an online resource for de novo peptide structure prediction", Nucleic Acids Research, May 11, 2009, 37, p. W498-W503.

Micsonai, et al., "BestSel: a web server for accurate protein secondary structure prediction and fold recognition from the circular dichroism spectra", Nucleic Acids Res, 2018, 46 (W1), p. W315-W322.
Monjo, M., et al., "Correlation between molecular signals and bone bonding to titanium implants", Clinical oral implants research, 24 (9), 2013, p. 1035-1043.
Moussa, et al, "Dentin Priming with Amphipathic Antimicrobial Peptides", J Dent Res, 2019, pp. 1112-1121, vol. 98, No. 10.
Moussa, et al., "Hydrophobic and antimicrobial dentin: A peptide-based 2-tier protective system for dental resin composite restorations", Acta Biomater, 2019, 88, p. 251-265.
Norowski, et al., Biomaterial and antibiotic strategies for peri-implantitis: a review. J Biomed Mater Res B Appl. Biomater 2009, 88 (2), pp. 530-543.
Olivares-Navarrete, R., et al., "Mediation of osteogenic differentiation of human mesenchymal stem cells on titanium surfaces by a Wnt-integrin feedback loop", Biomaterials, 32 (27), 2011, p. 6399-6411.
Orsini, G., et al., "Modern Trends in Dental Medicine: An Update for Internists", Am J Med, 131 (12), 2018, pp. 1425-1430.
Pettersen, et al., "UCSF chimera—A visualization system for exploratory research and analysis", Journal of Computational Chemistry, 2004, 25 (13), p. 1605-1612.
Zilberman, et al., "Antibiotic-eluting medical devices for various applications", Journal of Controlled Release, 2008, 130 (3), p. 202-215.
Pritchard, et al., "Antibiotic-Releasing Silk Biomaterials for Infection Prevention and Treatment", Advanced Functional Materials, 2013, 23 (7), p. 854-861.
Pruden, Amy, "Balancing water sustainability and public health goals in the face of growing concerns about antibiotic resistance", Environmental Science & Technology, 2013, 48 (1), p. 5-14.
Raphel, et al., "Multifunctional coatings to simultaneously promote osseointegration and prevent infection of orthopaedic implants", Biomaterials, 2016, 84, 42 pages.
Ronold, et al., "Tensile force testing of optimized coin-shaped titanium implant attachment kinetics in the rabbit tibiae", Journal of Materials Science: Materials in Medicine, vol. 14, p. 843-849.
Salvi, et al., "Prevalence and Mechanisms of Peri-implant Diseases", J Dent Res, 96 (1), 2017, p. 21-37.
Sarikaya, et al., "Molecular Biomimetics: Nanotechnology Through Biology", Nat Mater, 2003, 2 (9), p. 577-585.
Schaller, et al., "Peri-implantitis—onsent and pattern of progression", J Clin Periodontol, 43 (4), 2016, p. 383-388.
Schwarz, et al., "Peri-Implantitis", J Periodontol, 2018, 89 Suppl 1, p. S246-S266.
Tamerler, C., et al., "Genetically designed Peptide-based Molecular materials", ACS Nano, 2009, 3 (7), p. 1606-1615.
Tarnow, et al al., "Increasing Prevalence of Peri-implantitis: How Will We Manage?" J Dent Res, 95 (1), 2016, p. 7-8.
Thevenet, et al., "PEP-FOLD: an updated de novo structure prediction server for both linear and disulfide bonded cyclic peptides", Nucleic Acids Research, 2012, 40 (W1), p. W288-W293.
Torres, et al., "Peptide Design Principles for Antimicrobial Applications", Journal of Molecular Biology, 2019, 47 pages.
Valente, et al., "Peri-implant disease: what we know and what we need to know", J Periodontal Implant Sci, 46 (3), 2016, p. 136-151.
Van Oosten, et al., "Biosilver nanoparticle interface offers improved cell viability", Surf Innov, 2016, 4 (3), p. 121-132.
Wald, T., et al., "Intrinsically disordered enamel matrix protein ameloblastin forms ribbon-like supramolecular structures via an N-terminal segment encoded by exon 5", J Biol Chem, 2013, 288 (31), p. 22333-22345.
Walsh, et al., "Biointerface Structural Effects on the Properties and Applications of Bioinspired Peptide-Based Nanomaterials", Chem Rev, 2017, 117 (20), p. 12641-12704.
Wang, et al., "Antimicrobial peptides: Promising alternatives in the post feeding antibiotic era", Med Res Rev, 2019, 39 (3), p. 831-859.
Wang, et al., "APD3: the antimicrobial peptide database as a tool for research and education", Nucleic Acids Res, 2016, 44 (D1), p. D1087-D1093.

(56) References Cited

OTHER PUBLICATIONS

Warotayanont, et al., "Leucine-rich amelogenin peptide induces osteogenesis by activation of the Wnt pathway", Biochem Biophys Res Commun, 2009, (25), p. 558-563.

Warotayanont, et al., "Leucine-rich amelogenin peptide induces osteogenesis in mouse embryonic stem cells", Biochem Biophys Res Commun, 2008, 367 (1), p. 1-6.

Wiedemann, et al., "CAPITO—a web server-based analysis and plotting tool for circular dichroism data", Bioinformatics, 2013, 29 (14), p. 1750-1757.

Gasteiger, E., Wilkins, Marc et al., "Protein identification and analysis tools in the ExPASy server", Methods in Molecular Biology, 1999, 112, p. 571-607.

Wimley, et al., "Antimicrobial Peptides: Successes, Challenges, and Unanswered Questions", J Membr Biol, 239 (1-2), p. 27-34.

Wimley, et al., "Describing the Mechanism of Antimicrobial Peptide Action with the Interfacial Activity Model", ACS Chemical Biology, 2010, 5 (10), p. 905-917.

Wisdom, C., et al., "Repeatedly Applied Peptide Film Kills Bacteria on Dental Implants", JOM (1989), 2019, 71 (4), p. 1271-1280.

Wisdom, M., et al., "Controlling the Biomimetic Implant Interface: Modulating Antimicrobial Activity by Spacer Design", Journal of Molecular and Engineering Materials, 2016, 4 (1), 25 pages.

Yazici, et al., "Biological response on a titanium implant-grade surface functionalized with modular peptides", Acta Biomater, 2013, 9 (2), p. 5341-5352.

Yazici, et al., "Engineered Chimeric Peptides as Antimicrobial Surface Coating Agents toward Infection-Free Implants", ACS Appl Mater Interfaces, 2016, 8 (8), p. 5070-5081.

Yucesoy, et al., "Chimeric peptides as implant functionalization agents for titanium alloy implants with antimicrobial properties", JOM, 2015, 67 (4), p. 754-766.

Zhou, Y., et al., "Bio-Inspired hard-to-soft interface for implant integration to bone", Nanomedicine 2015, 11 (2), p. 431-434.

\* cited by examiner

SEQUENCE LISTING

<160> NUMBER OF SEQ ID NOS: 7

<210> SEQ ID NO 1
<211> LENGTH: 42
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 1

Arg Pro Arg Glu Asn Arg Gly Arg Glu Arg Gly Leu Gly Ser Gly Gly
1               5                   10                  15

```
Gly Lys Trp Lys Leu Trp Lys Lys Ile Glu Lys Trp Gly Gln Gly Ile
            20                  25                  30

Gly Ala Val Leu Lys Trp Leu Thr Thr Trp
        35                  40

<210> SEQ ID NO 2
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Gly Ser Gly Gly Gly
1               5

<210> SEQ ID NO 3
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Arg Pro Arg Glu Asn Arg Gly Arg Glu Arg Gly Leu
1               5                   10

<210> SEQ ID NO 4
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Lys Trp Lys Leu Trp Lys Lys Ile Glu Lys Trp Gly Gln Gly Ile Gly
1               5                   10                  15

Ala Val Leu Lys Trp Leu Thr Thr Trp
            20                  25

<210> SEQ ID NO 5
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Gly Lys Ile Ile Lys Leu Lys Ala Ser Leu Lys Leu Leu
1               5                   10

<210> SEQ ID NO 6
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Arg Pro Arg Glu Asn Arg Gly Arg Glu Arg Gly Leu Gly Ser Gly Gly
1               5                   10                  15
```

-continued

```
Gly Gly Lys Ile Ile Lys Leu Lys Ala Ser Leu Lys Leu Leu
            20                  25                  30

<210> SEQ ID NO 7
<211> LENGTH: 43
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Arg Pro Arg Glu Asn Arg Gly Arg Glu Arg Gly Leu Gly Ser Gly Gly
1               5                   10                  15

Gly Lys Trp Lys Leu Trp Lys Lys Ile Glu Lys Trp Gly Gln Gly Ile
            20                  25                  30

Gly Ala Val Leu Lys Trp Leu Thr Thr Trp Leu
            35                  40
```

MITIGATION OF PERI-IMPLANTITIS BY DESIGN AND STABILITY OF BIFUNCTIONAL PEPTIDES WITH ANTIMICROBIAL PROPERTIES

CROSS-REFERENCE TO RELATED APPLICATIONS

The application is a U.S. National Phase Application under 35 U.S.C. 371 of International Application No. PCT/US2020/049621, filed on Sep. 7, 2020, which claims the benefit of and priority to U.S. Provisional Patent Application No. 62/897,355, filed Sep. 8, 2019, each of which is incorporated by reference herein in its entirety.

STATEMENT OF U.S. GOVERNMENT SUPPORT

This invention was made with government support under AR062249 and DE027306 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Oct. 6, 2020, is named 104434-0277 SL.txt and is 2,906 bytes in size.

SUMMARY

Needed are compositions and strategies to improve the interface between dental implants with the surrounding soft and hard tissues in order to replace missing teeth and restore mastication. More than 3 million implants have been placed in the US alone and this number is rising by 500,000/year. Reduced service life and eventual implant failure have an adverse impact on public health and are associated with significant health care costs. The present technology addresses this need to help alleviate the adverse public health and health care cost issues.

In an aspect, a bifunctional peptide is provided of amino acid sequence RPRENRGRERGLGSGGGKWKLWKKIE-KWGQGIGAVLKWLTTW (SEQ ID NO: 1) or one or both of a pharmaceutically acceptable salt thereof and a solvate thereof. The bifunctional peptide of the present technology achieves: 1) nearly 100% surface coverage of dental implants within minutes, a timeframe suitable for their clinical application to existing dental implants; 2) nearly 100% binding to a titanium surface even in the presence of contaminating serum protein; 3) durability to brushing with a commercially available electric toothbrush; and 4) retention of antimicrobial activity on the implant surface following bacterial challenge. This bifunctional peptide can be applied to new implants and/or repeatedly applied to previously placed implants to control bacterial colonization, fighting peri-implant disease that threatens dental implant longevity.

In an aspect, a composition is provided that includes a bifunctional peptide of the present technology and a pharmaceutically acceptable carrier.

In an aspect, a method of treating peri-implant disease in a subject in need thereof is provided, where the method includes administering an effective amount of a bifunctional peptide of the present technology to a dental implant of the subject.

In an aspect, a method of controlling bacterial colonization on a dental implant in a subject is provided, where the method includes administering to the dental implant an effective amount of a bifunctional peptide of the present technology.

In an aspect, a method to control biofilm formation on a dental implant in a subject is provided, where the method includes administering to the dental implant an effective amount of the peptide of a bifunctional peptide of the present technology.

BRIEF DESCRIPTION OF THE DRAWINGS

FIG. 5A) and a comparative bifunctional peptide ("TiBP-GL13K"; FIG. 5B), where experimental CD spectra were collected in aqueous environment and increasing concentrations of 2,2,2-trifluoroethanol. The pie charts of FIG. 5C represent BeStSel's deconvolution of the CD spectra depicted in FIGS. 5A-5B.

DETAILED DESCRIPTION

Figure 1:
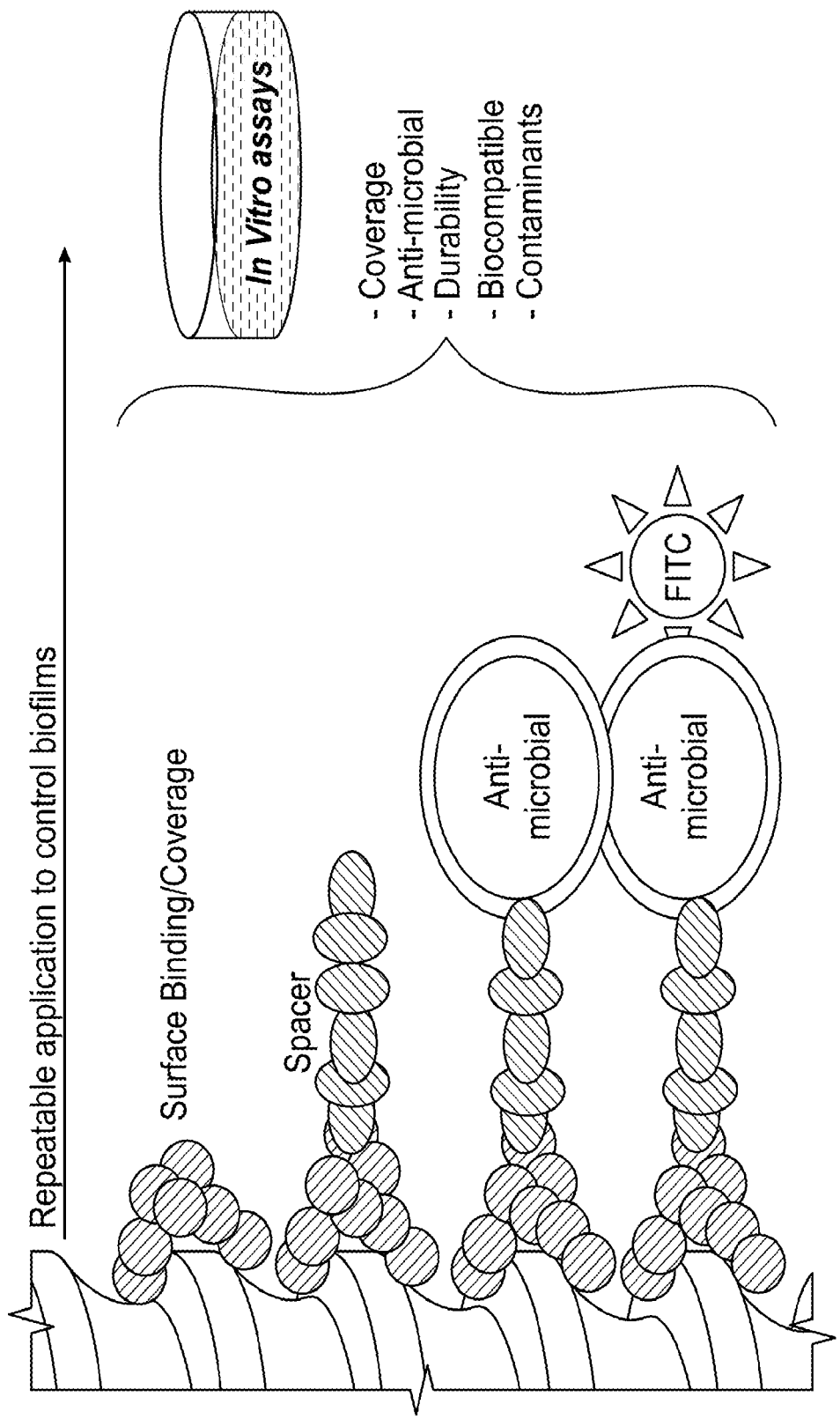
FIG. 1 depicts a schematic of an antimicrobial peptide film of the present technology based upon an engineered bifunctional peptide composed of peptide domains for implant binding and antimicrobial activity.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The phrase "and/or" as used in the present disclosure will be understood to mean any one of the recited members individually or a combination of any two or more thereof—for example, "A, B, and/or C" would mean "A, B, C, A and B, A and C, or B and C."

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

As used herein, the term "peptide" refers to a polymer of amino acid residues joined by amide linkages, which may optionally be chemically modified to achieve desired characteristics. The term "amino acid residue," includes but is not limited to amino acid residues contained in the group consisting of alanine (Ala or A), cysteine (Cys or C), aspartic acid (Asp or D), glutamic acid (Glu or E), phenylalanine (Phe or F), glycine (Gly or G), histidine (His or H), isoleucine (Ile or I), lysine (Lys or K), leucine (Leu or L), methionine (Met or M), asparagine (Asn or N), proline (Pro or P), glutamine (Gln or Q), arginine (Arg or R), serine (Ser or S), threonine (Thr or T), valine (Val or V), tryptophan (Trp or W), and tyrosine (Tyr or Y) residues. The term "amino acid residue" also may include unnatural amino acids or residues contained in the group consisting of homocysteine, 2-Aminoadipic acid, N-Ethylasparagine, 3-Aminoadipic acid, Hydroxylysine, β-alanine, β-Aminopropionic acid, allo-Hydroxylysine acid, 2-Aminobutyric acid, 3-Hydroxyproline, 4-Aminobutyric acid, 4-Hydroxyproline, piperidinic acid, 6-Aminocaproic acid, Isodesmosine, 2-Aminoheptanoic acid, allo-Isoleucine, 2-Aminoisobutyric acid, N-Methylglycine, sarcosine, 3-Aminoisobutyric acid, N-Methylisoleucine, 2-Aminopimelic acid, 6-N-Methyllysine, 2,4-Diaminobutyric acid, N-Methylvaline, Desmosine, Norvaline, 2,2'-Diaminopimelic acid, Norleucine, 2,3-Diaminopropionic acid, Ornithine, and N-Ethylglycine. Typically, the amide linkages of the peptides are formed from an amino group of the backbone of one amino acid and a carboxyl group of the backbone of another amino acid.

By "pharmaceutically acceptable" is meant a material that is not biologically or otherwise undesirable, e.g., the material may be incorporated into a pharmaceutical composition administered to a patient without causing any undesirable biological effects or interacting in a deleterious manner with any of the other components of the composition in which it is contained. When the term "pharmaceutically acceptable"

is used to refer to a pharmaceutical carrier or excipient, it is implied that the carrier or excipient has met the required standards of toxicological and manufacturing testing or that it is included on the Inactive Ingredient Guide prepared by the U.S. Food and Drug administration.

Pharmaceutically acceptable salts of peptides described herein are within the scope of the present technology and include acid or base addition salts which retain the desired pharmacological activity and is not biologically undesirable (e.g., the salt is not unduly toxic, allergenic, or irritating, and is bioavailable). When the compound of the present technology has a basic group, such as, for example, an amino group, pharmaceutically acceptable salts can be formed with inorganic acids (such as hydrochloric acid, hydroboric acid, nitric acid, sulfuric acid, and phosphoric acid), organic acids (e.g., alginate, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g., $Na^+$, $Li^+$, $K^+$, $Ca^{2+}$, $Mg^{2+}$, $Zn^{2+}$), ammonia or organic amines (e.g., dicyclohexylamine, trimethylamine, triethylamine, pyridine, picoline, ethanolamine, diethanolamine, triethanolamine) or basic amino acids (e.g., arginine, lysine and ornithine). Such salts can be prepared in situ during isolation and purification of the compounds or by separately reacting the purified compound in its free base or free acid form with a suitable acid or base, respectively, and isolating the salt thus formed.

The peptides of the present technology may exist as solvates, especially hydrates. Hydrates may form during manufacture of the compounds or compositions comprising the compounds, or hydrates may form over time due to the hygroscopic nature of the compounds. Compounds of the present technology may exist as organic solvates as well, including DMF, ether, and alcohol solvates among others. The identification and preparation of any particular solvate is within the skill of the ordinary artisan of synthetic organic or medicinal chemistry.

As used herein, "subject" refers to an animal, such as a mammal (including a human), that has been or will be the object of treatment, observation or experiment. "Subject" and "patient" may be used interchangeably, unless otherwise indicated. Mammals include, but are not limited to, mice, rodents, rats, simians, humans, farm animals, dogs, cats, sport animals, and pets. The methods described herein may be useful in human therapy and/or veterinary applications. In some embodiments, the subject is a mammal. In some embodiments, the subject is a human.

The term "treatment" or "treating" means administering a compound disclosed herein for the purpose of: (i) delaying the onset of a disease, that is, causing the clinical symptoms of the disease not to develop or delaying the development thereof; (ii) inhibiting the disease, that is, arresting the development of clinical symptoms; and/or (iii) relieving the disease, that is, causing the regression of clinical symptoms or the severity thereof.

The term "dental implant" refers to a titanium-containing post surgically placed (or to be surgically placed) in the upper or lower jaw of a subject, which functions as an anchor for one or more replacement teeth. The replacement tooth, commonly referred to as a dental crown, may be attached to the implant via an abutment, a connector that supports and holds the tooth.

Unless defined otherwise, all technical and scientific terms used herein have the same meaning as commonly understood by one of ordinary skill in the art to which this present technology belongs. Although any methods and materials similar or equivalent to those described herein can also be used in the practice or testing of the present technology, representative illustrative methods and materials are described herein.

Throughout this disclosure, various publications, patents and published patent specifications are referenced by an identifying citation. Also within this disclosure are Arabic numerals referring to referenced citations, the full bibliographic details of which are provided subsequent to the Examples section. The disclosures of these publications, patents and published patent specifications are hereby incorporated by reference into the present disclosure to more fully describe the present technology.

The Present Technology

There is a continuing need to improve patient treatment to ensure the longevity of the therapeutic advantages offered by titanium dental implants.[1-8] The creative fusion of molecular and cell biology with materials science and engineering has resulted in improved understanding of implant-tissue interfaces.[9] These advances have been translated clinically to improve oral and systemic health through the replacement of diseased teeth by titanium dental implants, among numerous other examples.[10-12] Titanium and its alloys have the requisite toughness needed to resist the repeated loading that occurs with food mastication. Titanium is biocompatible, and more importantly, inherently promotes its own integration into host bone by activating the Wnt/integrin signaling pathway for osteogenesis.[13]

In recent years, increased reliance on dental implants to restore missing teeth has resulted in a concomitant rise in the prevalence of peri-implant disease, a host-mediated immune response to bacteria which can shorten implant life and culminate in the loss of the implant.[14-15] A growing consensus suggests that peri-implant disease is similar to periodontal disease: bacterial plaque accumulation and microbiome dysbiogenesis trigger a host immune inflammatory response that destroys soft- and hard-peri-implant tissues.[16-18] Within weeks after implant placement, a biofilm develops consisting of the typical subgingival bacterial species, including keystone periodontal pathogens such as *A. actinomycetemcomitans, P. gingivalis, T. forsythia, T denticola,* and *P. intermedia*.[19-21] Dysbiosis shifts the relative abundance of commensal species to pathogens. For many patients, this shift induces the host to mount an inflammatory response leading to peri-implant disease, starting with peri-implant mucositis and progressing to peri-implantitis, which is accompanied by dramatic bone loss that can necessitate implant removal.[22] A treatment protocol that can slow and/or prevent bacterial infection may help to mitigate the host immune response and slow peri-implant disease progression.

The incidence of peri-implant disease is reported to be as high as 14.5% after 9 years of service although clinically significant, non-linear loss of bone support around the implants may be present as early as after 3 years after placement in more than 80% of patients.[23] With over 3 million implants placed in the US alone and growing by 500,000 implants/year[7], a reduced service life ending in implant failure will adversely impact public health, trigger increased health care costs and precipitate a loss of public confidence in the dental profession. Furthermore, this outcome may dissuade many patients who would benefit from the oral health benefits of implants to avoid this therapy. Currently, the goal of implant disease treatment is to control bacterial infection through mechanical debridement and plaque control in order to mitigate the host immune response, which can slow disease progression.[24] However, debridement, which is often performed with titanium brushes[25], results in implant surface damage and loss of biocompatibility. This hastens inevitable apical movement of the implant-supporting tissues and worsens the loss of supporting hard and soft tissue.

An additional challenge associated with prevention of implant infection is the increased incidence of bacterial resistance, which represents a major public health concern.[26-29] Novel antibacterial agents and strategies are needed to ensure future therapeutic efficacy.[30] While systemic antibiotics can treat infections that result from non-resistant bacteria, the peri-implant environment poses many challenges. Implant surfaces are susceptible to biofilm development as bacteria attach to the surface and synthesize an extracellular biofilm matrix.[31] An estimated 80% of human infections are associated with biofilms.[32] Biofilms respond differently to antibiotics than planktonic bacteria and are difficult for antibiotics to penetrate.[31,33] Poor antibiotic penetration into biofilms results in subtherapeutic antibiotic concentrations and increases the likelihood of developing antibiotic resistance.[34] Preventing the attachment and killing of planktonic bacteria to the implant surface, while killing them via the antimicrobial agents that do not lead to the development of resistance represents a novel strategy for reducing biofilm formation and preventing persistent infection that leads to implant failure.[35-36]

One approach to addressing bacterial resistance is the use of antimicrobial peptides (AMPs). AMPs are natural antimicrobials that form part of the innate immune defense peptides of both invertebrates and vertebrates. Most AMPs contain fewer than 50 amino acids and more than 2800 AMPs have been discovered from natural resources.[29] Integration of computer-assisted peptide design methods has increased the number of in silico designed antimicrobial peptides.[27-39] The mechanisms of AMP action includes membrane perturbation, disruption and/or translocation affecting diverse physiological events such as cell wall biosynthesis, pore formation, and cell division, as well as non-membrane-based pathways.[37,40] Furthermore, their antimicrobial affects can mitigate biofilm formation when used alone or in combination with other AMPs, or even with antibiotics, to achieve the desired antimicrobial effect and preserve the health of the host tissues without triggering resistance.

Systemic delivery of AMPs has been a major limiting factor in their wider use as therapeutics because a high AMP concentrations is required to achieve effective antimicrobial activity and such levels can potentially result in in vivo damage to host cells.[41] Local delivery of AMPs may overcome this challenge by reducing the required therapeutic concentration and thereby decrease the potential for deleterious effects on eukaryotic cells.[41] The advantages of delivering AMPs locally have been explored using a variety of methods for their retention on implant surfaces, including physical adsorption and chemical immobilization strategies. Chemical immobilization strategies include covalently attaching AMPs to the implant surfaces using silane-, catechol- and phosphate-groups.[42-45] Structural constraints introduced to the AMP during covalent coupling are known to limit antimicrobial activity, more so, the covalent coupling procedure can only be performed prior to implantation as they are generally performed under harsh conditions which prevents their intraoral application. To this point, the inventors recently demonstrated that amphipathic GL13K antimicrobial peptide can be used to coat dentin to resist recurrent caries around resin bonded dental restorations.[46-47]

Bifunctional Peptides

In an aspect, provided herein is a bifunctional peptide consisting of an amino acid sequence of RPRENRGR-ERGLGSGGGKWKLWKKIEKWGQGIGAVLKWLTTW (SEQ ID NO: 1), or one or both of a pharmaceutically acceptable salt thereof and a solvate thereof. The bifunctional peptide of the present technology is also alternatively referred to herein as "a peptide of the present technology," "the peptide of the present technology," "the peptide," and the like. The peptide of the present technology may include one or more D-amino acids as well as one or more L-amino acids. In any embodiment herein, the peptide may consist of only D-amino acids, or alternatively in any embodiment herein the peptide may consist only of L-amino acids. As discussed in the Examples, the bifunctional peptide of the present technology consists of a titanium binding peptide (TiBP) portion, a spacer portion, and an antimicrobial peptide (AMPs) portion. The bifunctional peptide of the present technology achieves: 1) nearly 100% surface coverage of implants within minutes, a timeframe suitable for their clinical application to existing implants; 2) nearly 100% binding to a titanium surface even in the presence of contaminating serum protein; 3) durability to brushing with a commercially available electric toothbrush; and 4) retention of antimicrobial activity on the implant surface following bacterial challenge. This bifunctional peptide film can be applied to new implants and/or repeatedly applied to previously placed implants to control bacterial colonization, fighting peri-implant disease that threatens dental implant longevity.

A peptide of the present technology may be synthesized by any technique known to those of skill in the art and by methods as disclosed herein. Methods for synthesizing the disclosed peptides may include chemical synthesis of proteins or peptides, the expression of peptides through standard molecular biological techniques, and/or the isolation of proteins or peptides from natural sources. The disclosed peptides thus synthesized may be subject to further chemical and/or enzymatic modification. Various methods for commercial preparations of peptides and polypeptides are known to those of skill in the art.

A peptide of the present technology may alternatively be made by recombinant means or by cleavage from a longer polypeptide. The composition of a peptide may be confirmed by amino acid analysis or sequencing.

Compositions

In an aspect, a composition is provided that includes a peptide of any embodiment disclosed herein, a pharmaceutically acceptable carrier or one or more excipients, fillers or agents (collectively referred to hereafter as "pharmaceutically acceptable carrier" unless otherwise indicated and/or specified). In a related aspect, a medicament for treating peri-implant disease is provided that includes a peptide of any embodiment disclosed herein and optionally a pharmaceutically acceptable carrier. In a related aspect, a medicament for controlling bacterial colonization on a dental implant is provided that includes a peptide of any embodiment disclosed herein and optionally a pharmaceutically acceptable carrier. In a related aspect, a medicament for controlling biofilm formation on a dental implant is provided that includes a peptide of any embodiment disclosed herein and optionally a pharmaceutically acceptable carrier. In a related aspect, a pharmaceutical composition is provided that includes an effective amount of a peptide of any embodiment disclosed herein as well as a pharmaceutically acceptable carrier. For ease of reference, the compositions, medicaments, and pharmaceutical compositions of the present technology may collectively be referred to herein as "compositions." In further related aspects, the present technology provides methods and uses that include a peptide of any aspect or embodiment disclosed herein and/or a composition of any embodiment disclosed herein as well as uses thereof.

"Effective amount" refers to the amount of a compound or composition required to produce a desired effect. One example of an effective amount includes amounts or dosages that yield acceptable toxicity and bioavailability levels for therapeutic (pharmaceutical) use including, but not limited to, treating peri-implant disease, controlling bacterial colonization on a dental implant, and/or controlling biofilm formation on a dental implant. In any aspect or embodiment disclosed herein (collectively referred to herein as "any embodiment herein," "any embodiment disclosed herein," or the like) of the compositions, pharmaceutical compositions, and methods including a peptide of the present technology, the effective amount may be an amount effective in treating peri-implant disease, controlling bacterial colonization on a dental implant, and/or controlling biofilm formation on a dental implant. By way of example, the effective amount of any embodiment herein including a peptide of the present technology may be from about 0.01 µg to about 200 mg of the peptide (such as from about 0.1 µg to about 50 mg of the peptide or about 10 µg to about 20 mg of the peptide). The methods and uses according to the present technology may include an effective amount of a peptide of any embodiment disclosed herein. In any aspect or embodiment disclosed herein, the effective amount may be determined in relation to a subject and/or in relation to a dental implant. The term "subject" and "patient" can be used interchangeably.

Thus, the instant present technology provides pharmaceutical compositions and medicaments including a peptide of any embodiment disclosed herein (or a composition of any embodiment disclosed herein) and a pharmaceutically acceptable carrier. The compositions may be used in the methods and treatments described herein. The pharmaceutical composition may be packaged in unit dosage form. The unit dosage form is effective in treating peri-implant disease, controlling bacterial colonization on a dental implant, and/or controlling biofilm formation on a dental implant when administered to a subject in need thereof and/or administered to a dental implant. Generally, a unit dosage including a peptide of the present technology will vary depending on patient considerations. Such considerations include, for example, age, protocol, condition, sex, extent of disease, contraindications, concomitant therapies and the like. Further, a unit dosage including a peptide of the present technology may vary depending on the dental implant considerations, such as the titanium surface area of the dental implant. An exemplary unit dosage based on these considerations may also be adjusted or modified by a physician skilled in the art. Suitable unit dosage forms, include, but are not limited to oral solutions, powders, lozenges, topical varnishes, lipid complexes, liquids, etc.

The pharmaceutical compositions and medicaments may be prepared by mixing a peptide of the present technology with one or more pharmaceutically acceptable carriers, excipients, binders, diluents or the like. Such compositions can be in the form of, for example, powders, syrup, emulsions, suspensions or solutions. The instant compositions can be formulated for various routes of administration, for example, by intraoral administration or via administration (e.g., application) to a dental implant external to a patient. The following dosage forms are given by way of example and should not be construed as limiting the instant present technology.

For intraoral administration, powders and suspensions are acceptable as solid dosage forms. These can be prepared, for example, by mixing a peptide of the instant present technology with at least one additive such as a starch or other additive. Suitable additives are sucrose, lactose, cellulose sugar, mannitol, maltitol, dextran, starch, agar, alginates, chitins, chitosans, pectins, tragacanth gum, gum arabic, gelatins, collagens, casein, albumin, synthetic or semi-synthetic polymers or glycerides. Optionally, oral dosage forms can contain other ingredients to aid in administration, such as an inactive diluent, or lubricants such as magnesium stearate, or preservatives such as paraben or sorbic acid, or anti-oxidants such as ascorbic acid, tocopherol or cysteine, a disintegrating agent, binders, thickeners, buffers, sweeteners, flavoring agents and/or perfuming agents.

Liquid dosage forms for oral administration (e.g., intraoral administration) may be in the form of pharmaceutically acceptable emulsions, syrups, suspensions, or solutions, which may contain an inactive diluent, such as water. Pharmaceutical formulations and medicaments may be prepared as liquid suspensions or solutions using a sterile liquid, such as, but not limited to, an oil, water, an alcohol, and combinations of these. Pharmaceutically suitable surfactants, suspending agents, emulsifying agents, may be added for oral administration.

As noted above, suspensions may include oils. Such oils include, but are not limited to, peanut oil, sesame oil, cottonseed oil, corn oil and olive oil. Suspension preparation may also contain esters of fatty acids such as ethyl oleate, isopropyl myristate, fatty acid glycerides and acetylated fatty acid glycerides. Suspension formulations may include alcohols, such as, but not limited to, ethanol, isopropyl alcohol, hexadecyl alcohol, glycerol and propylene glycol. Ethers, such as but not limited to, poly(ethyleneglycol), petroleum hydrocarbons such as mineral oil and petrolatum; and water may also be used in suspension formulations.

The pharmaceutical formulation and/or medicament may be a powder suitable for reconstitution with an appropriate solution as described above. Examples of these include, but are not limited to, freeze dried, rotary dried or spray dried powders, amorphous powders, granules, precipitates, or particulates. The formulations may optionally contain stabilizers, antimicrobial agents, antioxidants, pH modifiers, surfactants, bioavailability modifiers and combinations of these. The carriers and stabilizers vary with the requirements of the particular composition, but typically include nonionic surfactants (Tweens, Pluronics, or polyethylene glycol), innocuous proteins like serum albumin, sorbitan esters, oleic acid, lecithin, amino acids such as glycine, buffers, salts, sugars, or sugar alcohols. Powders and sprays can be prepared, for example, with excipients such as lactose, talc, silicic acid, aluminum hydroxide, calcium silicates and polyamide powder, or mixtures of these substances. Ointments, pastes, creams and gels may also contain excipients such as animal and vegetable fats, oils, waxes, paraffins, starch, tragacanth, cellulose derivatives, polyethylene glycols, silicones, bentonites, silicic acid, talc and zinc oxide, or mixtures thereof.

Besides those representative dosage forms described above, pharmaceutically acceptable excipients and carriers are generally known to those skilled in the art and are thus included in the instant present technology. Such excipients and carriers are described, for example, in "Remingtons Pharmaceutical Sciences" Mack Pub. Co., New Jersey (1991), and "Remington: The Science and Practice of Pharmacy," 20th Edition, Editor: Alfonso R Gennaro, Lippincott, Williams & Wilkins, Baltimore (2000), each of which is incorporated herein by reference.

Methods

Disclosed herein, in one aspect, is an method for slowing or halting the progression of peri-implant disease by applying a bifunctional peptide of the present technology to a dental implant, e.g., to produce a film on the dental implant. This film can be applied in two minutes and can be repeated at follow up appointments. The renewable effects of the bifunctional peptide upon successive reapplication was evaluated on bacteria-fouled and -cleaned dental implant surfaces as described in the Examples, mimicking the re-treatment of implants affected by peri-implant disease in a dental office.[59] The sequence-structure-function relationships were systematically studied of a bifunctional peptide of the present technology along with a different bifunctional peptide that incorporated structurally distinctive antimicrobial peptides combined with the same anchoring domain using a newly developed longer, more rigid peptide spacer. Secondary structure prediction suggested that greater helical content could improve antimicrobial activity while preserving the intrinsically disordered behavior TiBP for effective surface binding. The resulting bifunctional peptides were evaluated for their suitability for clinical deployment using tests of peptide binding, stability, antimicrobial function and durability in vitro on titanium implant discs (FIG. 1). The bifunctional peptide of the present technology selectively binds to titanium/titanium alloy implant surfaces and delivers an antimicrobial peptide film in as little as two minutes. As also illustrated in the Examples, the water-based delivery system described herein was used to apply the bifunctional peptide repeatedly during dental office visits applied to modify bacterial growth. This non-surgical approach can improve oral health by controlling microbial dysbiogenesis and reducing peri-implant disease progression.

In another aspect, provided herein are methods of treating peri-implant disease in a subject in need thereof, the methods comprising, consisting essentially of, or consisting of administering an effective amount of a bifunctional peptide of the present technology or a composition of the present technology to a dental implant in the subject.

In another aspect, provided herein are methods of treating peri-implantitis in a subject in need thereof, the methods comprising, consisting essentially of, or consisting of administering an effective amount of a peptide of the present technology or a composition of the present technology to a dental implant in the subject.

In another aspect, provided herein are methods of controlling bacterial colonization on a dental implant in a subject in need thereof, the methods comprising, consisting essentially of, or consisting of administering an effective amount of a peptide of the present technology or a composition of the present technology to a dental implant in the subject.

In another aspect, provided herein are methods of controlling biofilm formation on a dental implant in a subject in need thereof, the methods comprising, consisting essentially of, or consisting of administering an effective amount of a peptide of the present technology or a composition of the present technology to a dental implant in the subject.

The examples herein are provided to illustrate advantages of the present technology and to further assist a person of ordinary skill in the art with preparing or using the compounds and compositions of the present technology. The examples herein are also presented in order to more fully illustrate the preferred aspects of the present technology. The examples should in no way be construed as limiting the scope of the present technology, as defined by the appended claims. The examples can include or incorporate any of the variations, aspects, or embodiments of the present technology described above. The variations, aspects or aspects described above may also further each include or incorporate the variations of any or all other variations, aspects, or embodiments of the present technology.

EXAMPLES

Example 1. Materials and Methods

Peptide Synthesis, Purification, and FITC-Derivatization

Peptides were synthesized by standard solid phase peptide synthesis technique using Fmoc chemistries and Wang resins (AAPPTec Focus XC solid phase peptide synthesizer, Louisville, KY). Fmoc protecting groups were removed by 20% piperidine in dimethylformamide (DMF). Following deprotection, piperidine was removed by DMF and the samples were solubilized in DMF at a concentration of 0.2M and added in 7-fold excess. The amino acids were activated with 0.4M O-benzotriazole-N,N,N',N'-tetramethyl-uronium-hexafluoro-phosphate (HBTU) and 1M 4-methyl morpholine (NMM) in DMF. Reactions were performed with mechanical mixing under nitrogen gas. Resin-bound peptides were dried with ethanol and cleaved using a cleavage cocktail. Reagent K (TFA/thioanisole/phenol/ethanedithiol at a ratio of 87.5:5:5:2.5) was used to deprotect side-chain and peptides were precipitated with cold ether. The crude peptides were purified using reverse phase-HPLC to greater than 98% purity, lyophilized and stored at −20° C. Fluorescein 5(6)-isothiocyanate (FITC) was used to fluorescently derivatize bifunctional peptides on their free C'-termini for experiments requiring visualization of bifunctional peptide molecules bound to the surface of titanium implant discs.

Peptide Property Calculations

Physicochemical data on the peptides including molecular weight, isoelectric point, charge and GRand AVerage of hydropathY (GRAVY) scores were obtained using the ExPasy ProtPram Server.[65] Hydrophobicity was evaluated by the antimicrobial peptide database (APD3).[38]

Peptide CD Data Collection and Secondary Structure Prediction

Secondary structure estimation was accomplished using a Jasco J-810 circular dichroism (CD) spectrophotometer. Solutions of 40 μM peptide in 100 mM Tris-HCL buffer with varying volumes of 2,2,2-trifluoroethanol (TFE) were prepared for CD analysis. A minimum of 8 scans over wavenumber 190-260 nm with a scan rate of 0.5 nm/min were collected on a calibrated spectrophotometer and averaged. The background was subtracted, and the spectra smoothed using the Savitzky-Golay algorithm. The resulting CD spectra were deconvoluted using the BeStSel web server for accurate prediction of protein secondary structure and folding.[66] Predicted secondary structure contents for helical (α, $3_{10}$ and π-helix), beta (β-bridge, bonded turn), and irregular (bend and loop) features were determined using the Chou-Fasman algorithm. The Chou-Fasman algorithm was applied for each bifunctional peptide after uploading their CD spectra and amino acid sequences using the online server available through the CD Analysis and Plotting Tool (CAPITO).[67]

Peptide Structure Analysis

The de novo 3D structural modeling algorithm, PEP-FOLD 3.5, was implemented to generate Protein Data Base (PDB) models for a minimum of five of the best predictions for each bifunctional peptide sequences.[68-69] PEP-FOLD 3.5 was used to generate 3D-structural conformations of linear peptides. PEP-FOLD 3.5 generates peptide structures by assigning one of 27 structural alphabets where fragments of four amino acid residues overlap with three residues. The structural alphabet generalizes the secondary structure by assigning geometric descriptors created by the Hidden Markov model as described by Maupetit et. al.[70] 3D models were ultimately generated from the fragments using a coarse-grained representation and refined by 30,000 Monte-Carlo steps using the PEP-FOLD 3.5 online service on an average of 200 simulations executed assuming aqueous conditions and neutral pH. Once generated, the models were clustered and sorted using sOPEP (Optimized Potential for Efficient Structure Prediction) with non-biased modeling. Similarity among the predicted secondary structure models for the bifunctional peptides was compared for each of the constituent domains: titanium binding domain (TiBP), spacer, and each of two unique antimicrobial domains using the MatchMaker tool. The individual constituent domain structures were superimposed on the corresponding segments of the bifunctional peptide structure. The Match-Align tool was used with a 5 Å threshold and the percent identity or degree of relatedness was recorded. Backbone rigidity of the bifunctional peptides was predicted using the DynaMine webserver following their amino acid sequence in FASTA format.[71] The server segmented the sequence and the fragments were used as the input for the DynaMine predictor for the given segment length. The predictions for each segment were reassembled to produce a dynamics profile from the amino acid sequence.

Protein Data Bank files containing the secondary structure models generated by PEP-FOLD 3.5 were visualized and further analyzed by the UCSF Chimera program[72]. The theoretical "footprint" for each bifunctional peptide was calculated using the measure tool in Chimera. The footprint was determined by obtaining the distance from the α-carbon of amino acid residues to obtain length and width values. These measurements were converted to corresponding area and the number of peptide molecules required to saturate a 10 mm disc surface area serving as an implant mimic was determined. The number of peptides was converted to a molecular mass required to deliver the corresponding surface coverage to the titanium implant disc surface.

A web interface program DichroCalc[73] was used to predict the theoretical circular dichroism spectra from secondary structures models predicted with PEP-FOLD 3.5. Spectra were requested in ellipticity units [(deg cm$^2$)/dmol] over wavenumber 190 nm to 260 nm and compared to the corresponding experimentally collected spectra. The Hirst ab initio parameter set was used for backbone chromophores.

Titanium Implant Disc Preparation

Coin-shaped titanium implant discs were made from grade 4 titanium in the USC Engineering Shop. The discs were 10 mm in diameter and 0.5 mm thick, lap-polished and grit-blasted with 180-220 micron titanium dioxide particles. Following manufacturing, the discs were cleaned as stated in a published protocol used for producing surfaces optimal for osseous integration.[4] The protocol included sonication in DI $H_2O$ for 5 minutes, ethanol for 30 seconds, DI $H_2O$ for 30 seconds, 40% sodium hydroxide for 10 minutes, washed in DI $H_2O$ for 5 minutes, 50% nitric acid for 10 minutes followed by rinsing with DI $H_2O$ for 5 minutes. The discs were autoclaved prior to use.

Peptide Binding to Implant Discs

Titanium implant disc functionalization with bifunctional peptides was accomplished by incubating 100 µL of a specified fold concentration of the theoretical "footprint" concentration onto clean, sterile discs for different time periods at 37° C. for 2 minutes. Following incubation, the discs were transferred to a sterile well in a 24-well plate containing 500 µL of DI $H_2O$ and washed multiple times to remove unbound peptide. The discs were transferred to a clean glass microscope slide for imaging using a fluorescent microscope. All experiments were repeated a minimum of three times and images were recorded at 10× magnification.

Determination of Surface Coverage

A custom MatLab script was developed to determine the percent surface coverage of fluorescently labeled bifunctional peptides on the implant disc surface. The color fluorescent images were read into MatLab using the imread function. The images were converted to black and white and the total number of black and white pixels quantitated. The number of white pixels corresponding to the fluorescently labeled peptides was divided by the total number of pixels to determine the percent surface coverage.

Serum Competition Assay

Serum competition binding assay was completed with 1.0 wt. %, and 5.0 wt. % of bovine serum albumin (BSA) at selected theoretical "footprint" concentrations of FITC-labeled bifunctional peptide. Prior to functionalization of sterile titanium implant discs, a solution of BSA and the bifunctional peptide was made in a sterile centrifuge tube. In a sterile 24 well plate, 100 µL of the BSA/bifunctional peptide solution was pipetted onto a titanium implant disc and incubated at 37° C. for 2 minutes. The discs with BSA/bifunctional peptide were transferred to a new well containing 500 µL sterile deionized water for 1 minute and washed to remove unbound peptide. The discs were transferred onto a clean glass microscope slide and imaged as previously described.[59]

Mechanical Durability Assay

Sterile titanium implant discs were functionalized with FITC-labeled bifunctional peptides and brushed using a commercially available electric toothbrush. Deionized water was applied to the functionalized discs and an electric toothbrush with a round head the same size as the implant disc was applied to the disc for 1 minute. A 100 g weight was secured to the toothbrush 10 cm from the brush head to ensure consistent force during brushing. Following brushing the implant disc was imaged.

Bacteria Culture

*Streptococcus mutans* bacteria (ATCC 700610) were cultured according to an ATCC protocol. Frozen stocks were streak plated on agar and incubated for 24 hours at 37° C. in atmosphere with 5% $CO_2$. A single bacterial colony was used to inoculate 5 mL of Brain Heart Infusion (BHI) broth in a sterile 50 mL conical tube and incubated overnight in the same conditions. Following incubation, 1 mL of culture was added to 9 mL of fresh media and grown to mid-log phase with a final concentration of 105 CFU/mL.

Visualizing Bacteria on Implant Discs

Following the functionalization of titanium discs, they were transferred to a sterile well in a 24-well plate and 400 µL of *S. mutans* bacteria at a concentration of $10^3$ CFU/mL was added to the wells containing the discs and incubated for 24 hours at 37° C. in atmosphere with 5% $CO_2$. Following incubation, discs were imaged with a fluorescent microscope to visualize FTIC-labeled bifunctional peptides on the disc surface after bacterial challenge. The dead bacteria were stained with propidium iodide and imaged using a fluorescent microscope. Experiments were repeated in triplicate and images were recorded at 10× magnification.

Example 2. Bifunctional Peptides

The structure-function relationship of bifunctional peptides designed with two distinct antimicrobial peptide domains was explored. Each bifunctional peptide molecule incorporated three peptide domains: an implant anchoring domain provided by the TiBP, an antimicrobial domain provided by the AMP, and a spacer domain to ensure the functionality of each of the two other domains when constrained within a single peptide chain. Computationally derived rules for predicting performance of antimicrobial bifunctional peptide films were experimentally evaluated for antimicrobial activity, extent of film coverage and binding, binding under competition from interloper contaminants, and mechanical durability within clinically relevant parameters needed by dentists to treat peri-implant disease.

Design by Structure Prediction from Amino Acid Sequence

Earlier work had identified secondary structure rules that associate greater antimicrobial property with α-helix features adopted over 4- and 5-amino acid residues.[63] Based on this, the CAPITO webserver provided in the Antimicrobial Peptide Database (APD) that contains the cationic AMPs identified with low minimum inhibitory concentrations (MIC) against oral pathogens based on their percentage of α-helix secondary structure was screened.[67] The method implemented in CAPITO uses the Chou-Fasman algorithm to analyze the relative frequencies of amino acids adopting a specific secondary structure conformation based on protein structures previously solved by X-ray crystallography. The secondary structure prediction mainly relies on the probability parameters obtained for the occurrence of α-helix, β-sheet and turns. The Chou-Fasman method is roughly 60% accurate in predicting secondary structures compared to 80% accuracy achieved by some of the recent machine learning approaches[74]; however computationally it is a simple and efficient method for approximating secondary structure content starting from an amino acid sequence. Chou-Fasman was used as an initial estimation tool in developing rules for the antimicrobial peptide film property. Two AMPs were identified with low MIC: AMPA75, comprised of 60% predicted α-helix forming amino acids and GL13K76 containing no predicted α-helix forming amino acids (Table 1). Titanium binding peptides were selected using phage display and characterized for their binding affinity using Quartz Crystal Microbalance Spectroscopy (QCM).[58,63] Based upon this earlier work, one of the strong titanium binding peptides was selected as a promising candidate for the bifunctional peptide film.[58] When AMPA s combined with a spacer to the titanium binding peptide (TiBP) domain, the α-helix content of the resulting bifunctional TiBP-AMPA increased to 69%. Whereas combining TiBP with GL13K resulted in a drastic change to the α-helix content for the bifunctional TiBP-GL13K molecule, with α-helix content as low as 50%.

Native chimeric proteins containing multiple functional domains often are separated by inter-domain sequences called "spacers" that enable multiple domains to coexist on a single polypeptide chain. Inspired by this, different spacer sequences were studied when designing the bifunctional peptides described herein. The goal of the spacer design was to preserve and enhance the function of each of the functional domains within the molecule. The effects of spacers on the overall bifunctional peptide were previously assessed by testing them with a single antimicrobial peptide, AMP1, linked with a strong titanium binding peptide sequence (TiBP).[58,62-63,77] Here, a five-amino-acid spacer, i.e., GSGGG (SEQ ID NO: 2), resulted in drastic improvement of the antimicrobial efficacy against *S. epidermis*, compared to a three amino acid, GGG spacer.[78] It was therefore selected to combine the TiBP domain to each of the two selected AMPs using the GSGGG (SEQ ID NO: 2) spacer.

TABLE 1

Chou-Fasman secondary structure predictions from amino acid sequences for the bifunctional peptide and its constitutive domains.

|  | α-helix | β-strand | irregular |
| --- | --- | --- | --- |
| TiBP | 0% | 0% | 100% |
| AMPA | 60% | 0% | 40% |
| GL13K | 0% | 0% | 100% |
| TiBP-AMPA | 69% | 0% | 31% |
| TiBP-GL13K | 50% | 0% | 50% |

Secondary structure features including helix (α, $3_{10}$ and π-helix), beta (β-bridge, bonded turn), and irregular (bend and loop) features are shown in Table 1.

Table 2 provides the physicochemical properties for AMPs and the related bifunctional peptide. Both of the AMPs selected are cationic with net positive charge of 5 and 4, respectively for AMPA and GL13K. In contrast, the net charges of the corresponding bifunctional peptides, TiBP-AMPA and TiBP-GL13K increased to 8 and 7, respectively.

TABLE 2

Physicochemical properties of peptides.

|  |  | #AA | MW | pI | Charge | GRAVY |
| --- | --- | --- | --- | --- | --- | --- |
| TiBP | RPRENRGRERGL (SEQ ID NO: 3) | 12 | 1496 | 12 | +3 | −2.6 |
| AMPA | KWKLWKKIEKWGQG IGAVLKWLTTW (SEQ ID NO: 4) | 25 | 3085 | 10 | +5 | −0.4 |
| GL13K | GKIIKLKASLKLL (SEQ ID NO: 5) | 13 | 1429 | 11 | +4 | 0.7 |
| TiBP-AMPA | RPRENRGRERGL GSGGG KWKLWKKI EKWGQGIGAVLKWL TTW (SEQ ID NO: 1) | 43 | 4991 | 12 | +8 | −1 |
| TiBP-GL13K | RPRENRGRERGL GSGGGG KIIKLKA SLKLL (SEQ ID NO: 6) | 30 | 3218 | 12 | +7 | −0.8 |

The Chou-Fasman secondary structure algorithm predicted greater helical content in the bifunctional peptides compared to either of the AMP domains in isolation. Further, the distribution of secondary structure between the AMPs in isolation compared to the bifunctional peptides suggested that the AMPA domain retained a greater percentage of secondary structure than GL13K. Thus, it was predicted that a design with AMPA would have greater antimicrobial potential than one containing GL13K. The limitations of Chau-Fasman in predicting secondary structure were recognized; however, the GL13K α-helix prediction differed only by 10% from a recently reported estimate on the secondary structure of GL13K using a complementary approach.[46-47]

Design by Hydrophobicity and Amphipathicity

Figure 2:
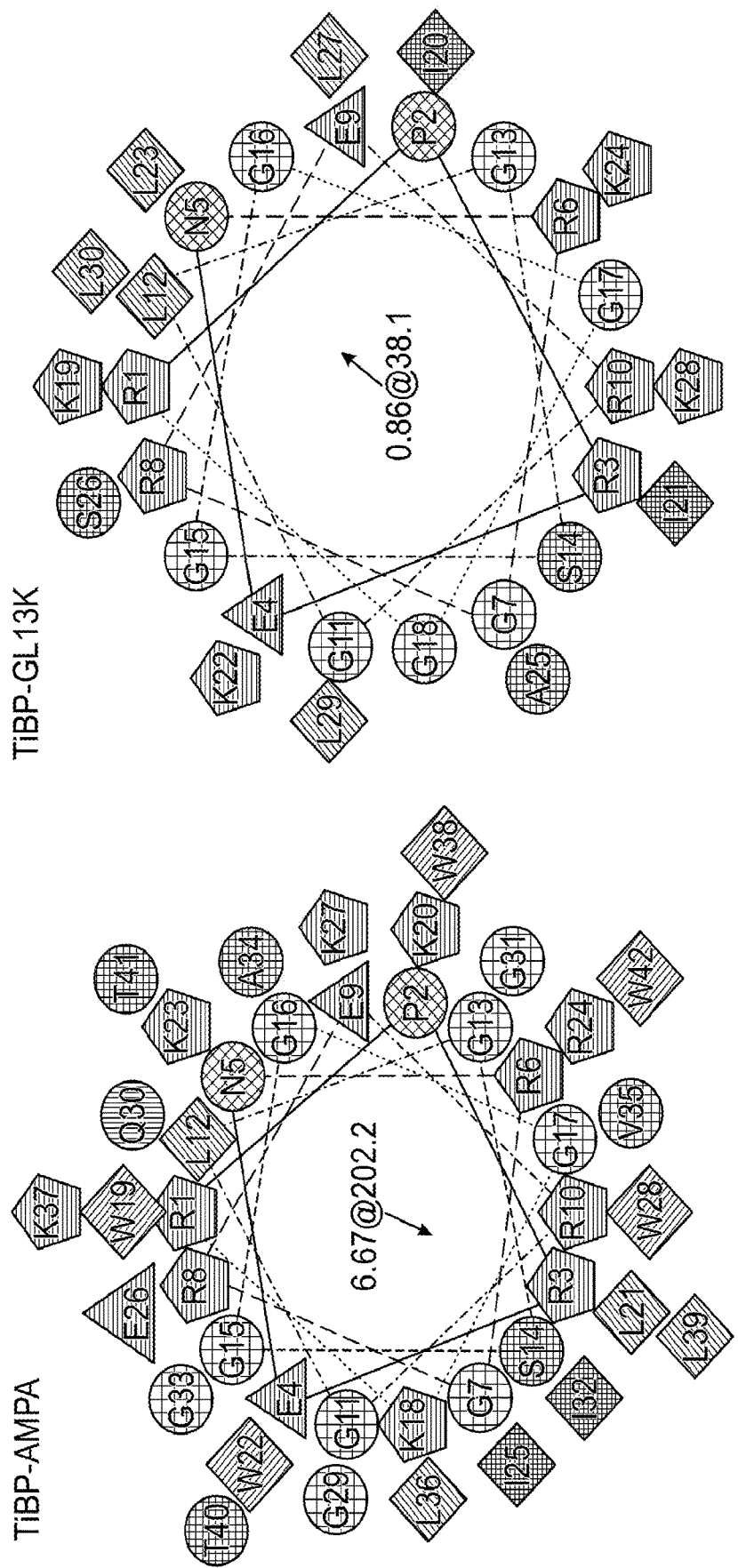
FIG. 2 depicts helical wheel predictions of a bifunctional peptide of the present technology ("TiBP-AMPA") and a comparative bifunctional peptide ("TiBP-GL13K"). Hydrophilic amino acid residues are represented as circles, hydrophobic amino acid residues as diamonds, potentially negatively charged residues as triangles, and potentially positively charged residues as pentagons. The most hydrophobic amino acid residue is shown in green with the chroma intensity decreasing proportionally to hydrophobicity, with zero hydrophobicity coded as yellow. Hydrophilic residues are coded red with intense red chroma being the most hydrophilic (uncharged) residue, and the chroma decreasing proportionally to the hydrophilicity. Potentially charged residues are shown as blue.

Hydrophobicity and amphipathicity are believed to allow the AMPs to penetrate a bacterial lipid bilayer and disrupt the cell membrane.[79-80] Using the Calculate and Predict tool from the Antimicrobial Peptide Database (APD), it was determined that TiBP-AMPA has a hydrophobic ratio of 30% with 10 hydrophobic residues aligned along the same surface of the α-helix. TiBP-GL13K revealed a hydrophobic ratio of 26%, slightly less than that of TiBP-AMPA, with only 5 hydrophobic residues aligned on the same surface. This sequence analysis revealed that the majority of the hydrophobic amino acids in both bifunctional peptides were located in the AMP region. The TiBP region contains only one hydrophobic residue on the C'-terminus of the binding peptide, immediately before the spacer. The hydrophobic nature of the bifunctional peptide is attributed to the AMP portion, which may increase the likelihood of the AMP interacting with the bacterial membrane while the binding domain remains anchored on the implant surface. To visually demonstrate this distribution of residues, helical wheels were generated using an online tool (http://rzlab.ucr.edu/scripts/wheel/wheel.cgi). The helical wheel diagrams represented in FIG. 2 show that 10 hydrophobic residues reside on the same surface of the α-helix for TiBP-AMPA compared to only 5 for TiBP-GL13K.

Dynamics Prediction in Bifunctional Peptide Design

Figure 3A:
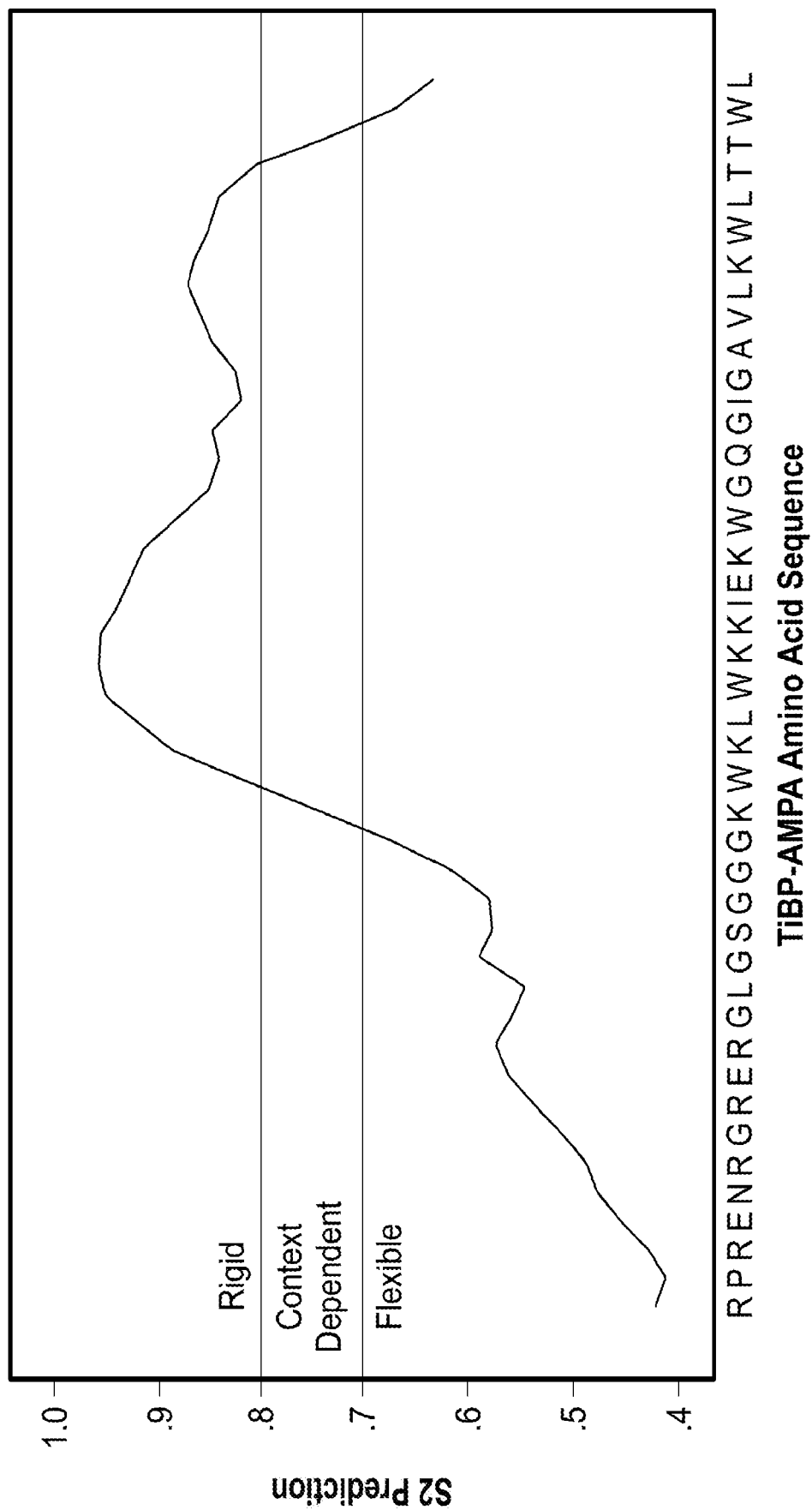
FIGS. 3A-3B depict DynaMine classification for backbone dynamics of amino acids of a bifunctional peptide of the present technology (SEQ ID NO: 7) (FIG. 3A) and a comparative bifunctional peptide (SEQ ID NO: 6) (FIG. 3B). The AMP domains located on the C'-terminus represent a more ordered region relative to the TiBP binding domain located on the N'-terminus. The TiBP domain is an intrinsically disordered peptide. AMPA has more order than GL13K, which could contribute to its greater predicted antimicrobial function.
Figure 3B:
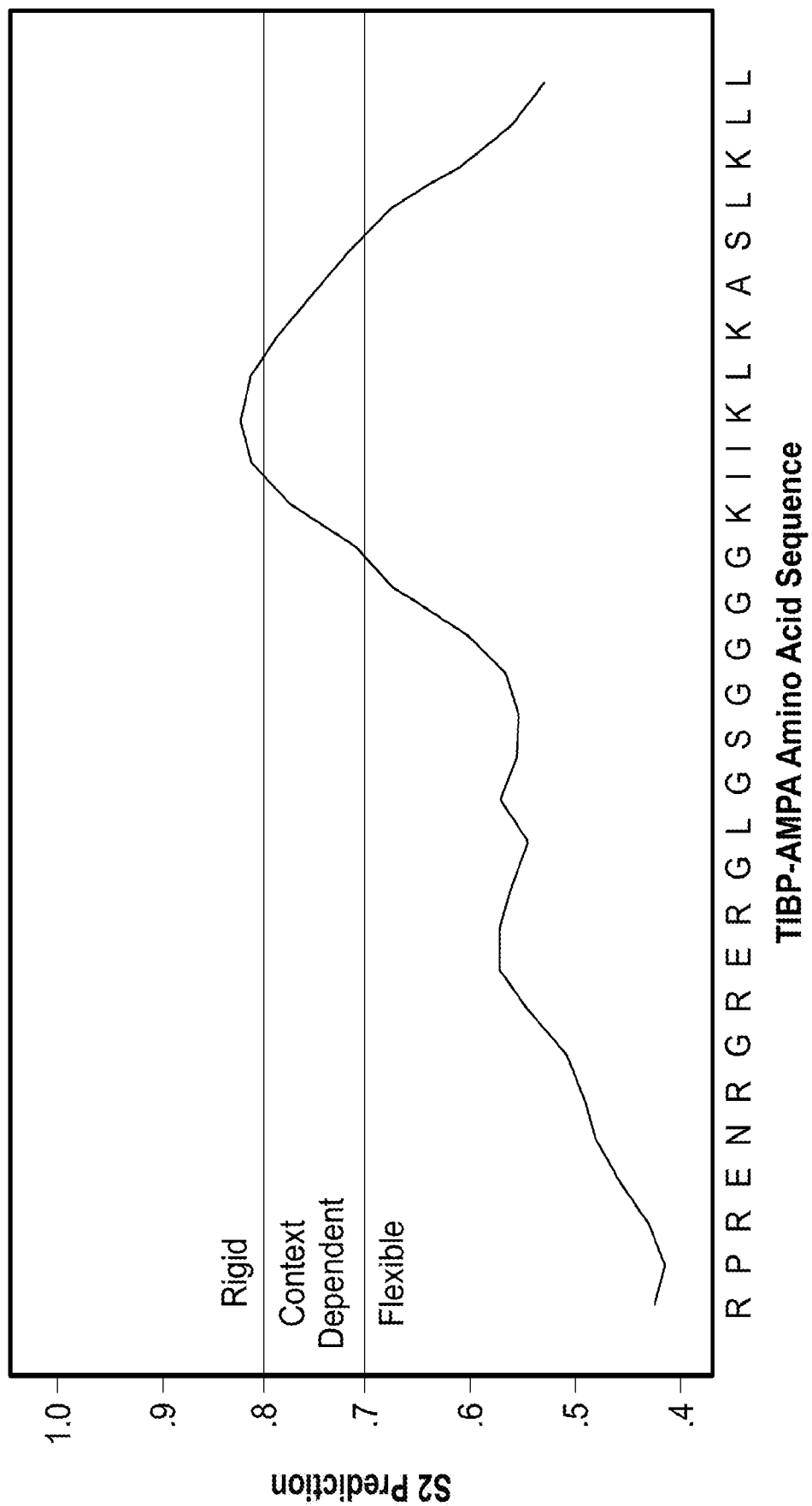

Next, the dynamics of the peptide backbone were studied to determine the disorder of the regions within the whole bifunctional peptide relative to their constitutive binding, spacer, and AMP domains. DynaMine, a tool that leverages chemical shift data to make predictions about backbone dynamics at the amino acid residue level, was used for these purposes. The dynamics of the residues are essential for peptide function, so evaluating the backbone dynamics in relation to the bifunctional peptide function is important in considering the design of these peptides.[81] Given a protein sequence, DynaMine predicts backbone flexibility at the level of amino acid residue in the form of backbone N-H S2 order parameter values. These S2 values represent how restricted the movement of the atomic bond vector is with respect to the molecular reference frame. The results from the DynaMine analysis are depicted in FIGS. 3A-3B.

The more hydrophilic amino acids located in the AMP domain of the bifunctional peptide correspond to the more ordered region of the bifunctional peptide. The Gly and Ser residues comprising the spacer region are known to be more disordered, serving to promote the propensity for a more dynamic backbone that improves overall function of the molecule, namely binding to the implant surface while presenting an active antimicrobial domain. This is important for dental implants as the accumulation of a biofilm on the implant is believed to lead to an adverse host immune response to the bacterial antigens, resulting in host directed inflammatory destruction of soft and hard tissues surrounding the implant.[18,22,82-83] Consistent with this interpretation, the binding domain for the bifunctional peptides showed the least variation in order. Intrinsically disordered proteins (IDPs) function in a wide spectrum of biological situations due to their ability to adapt their structure by adopting conformation over a small number of amino acid residues.[71,84-86] Thus, it would be expected that the dynamics of the binding domain may resemble the range of conformational structure observed within IDPs.

Secondary Structure Modeling and Analysis

Figure 4:
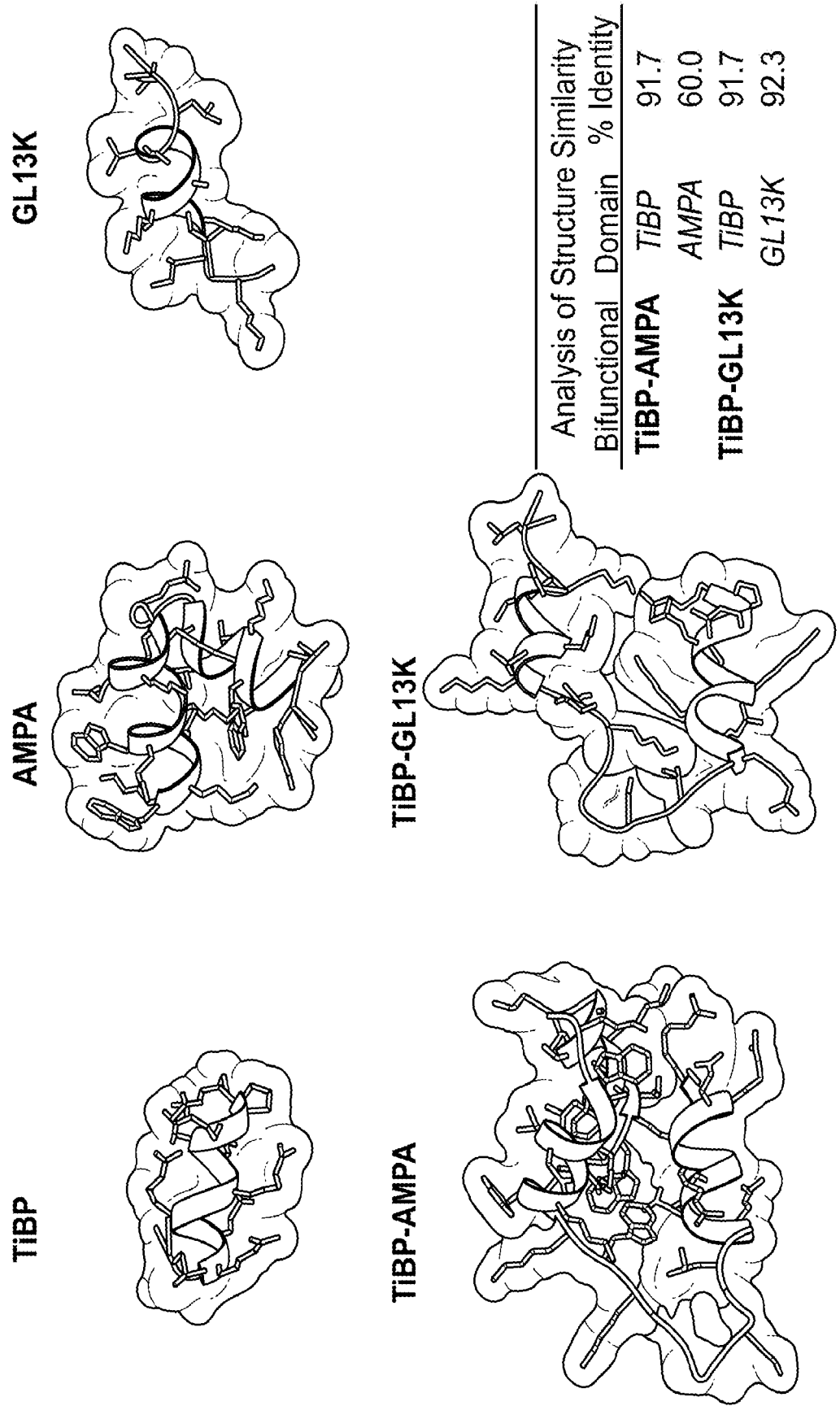
FIG. 4 depicts secondary structure models and structural similarity analysis of two non-limiting examples of bifunctional peptide of the present technology. Each TiBP domain is colored purple, the AMPA domain is colored orange and the GL13K domain is colored red, while the spacer domain linking the antimicrobial and binding domains is colored black. The chart depicts the structural similarity determined by superimposing the domain models over the bifunctional models and calculating the percent identity.

A more in depth secondary structure prediction was accomplished by developing structural models from the amino acid sequences using PEP-FOLD 3.5.[87] Secondary structure models generated for the individual domains and the bifunctional peptide appear in FIG. 4. Secondary structural analysis of the antimicrobial peptide domains, AMPA and GL13K, revealed that the AMPA domain is composed of two short α-helixes joined by a turn while GL13K is composed of one short α-helix. The Chou-Fasman analysis did not identify helicity exclusive to the GL13K domain, although helicity was predicted for the bifunctional peptide, TiBP-GL13K.

Without being bound to theory, the mechanism by which amphipathic α-helical AMPs kill bacteria may involve their creation of trans-bilayer pores which serve to disrupt the bacterial membrane by separating the polar from the non-polar parts.[88] Thus, it was predicted TiBP-AMPA would have greater antimicrobial activity than TiBP-GL13K due to the larger number of membrane-disrupting helical features present in AMPA (two features) compared to GL13K (one feature).

Using Chimera, the PDB files were compared using the MatchMaker tool and the structure models superimposed.[89] Similarity among the individual functional domains was evaluated by superimposing structural models for the AMP and TiBP domains alone on the corresponding portions of the bifunctional peptide. The superimposed structures were further studied to determine the percent identity or the degree of relatedness. This was useful in determining the preservation of the TiBP and each AMP domain when linked by the spacer in the whole bifunctional peptide. This analysis revealed that 91.7% of the TiBP domain identity was preserved when combined with either AMPA or GL13K through the GSGGG (SEQ ID NO: 2) spacer. The GL13K domain retained 92.3% identity, while the AMPA domain retained only 60% identity. This suggests that most of the secondary structures of the TiBP and GL13K domains are preserved by the GSGGG (SEQ ID NO: 2) spacer, while further engineering of the spacer may potentially improve the antimicrobial activity of TiBP-AMPA. Preservation of the TiBP domain is postulated to be critical for binding to the implant surface in the presence of competing proteins while contributing to the durability of the bifunctional peptide in the oral environment which is an essential property for effective clinical deployment.

Experimental Determination of Secondary Structure

Figure 5A:
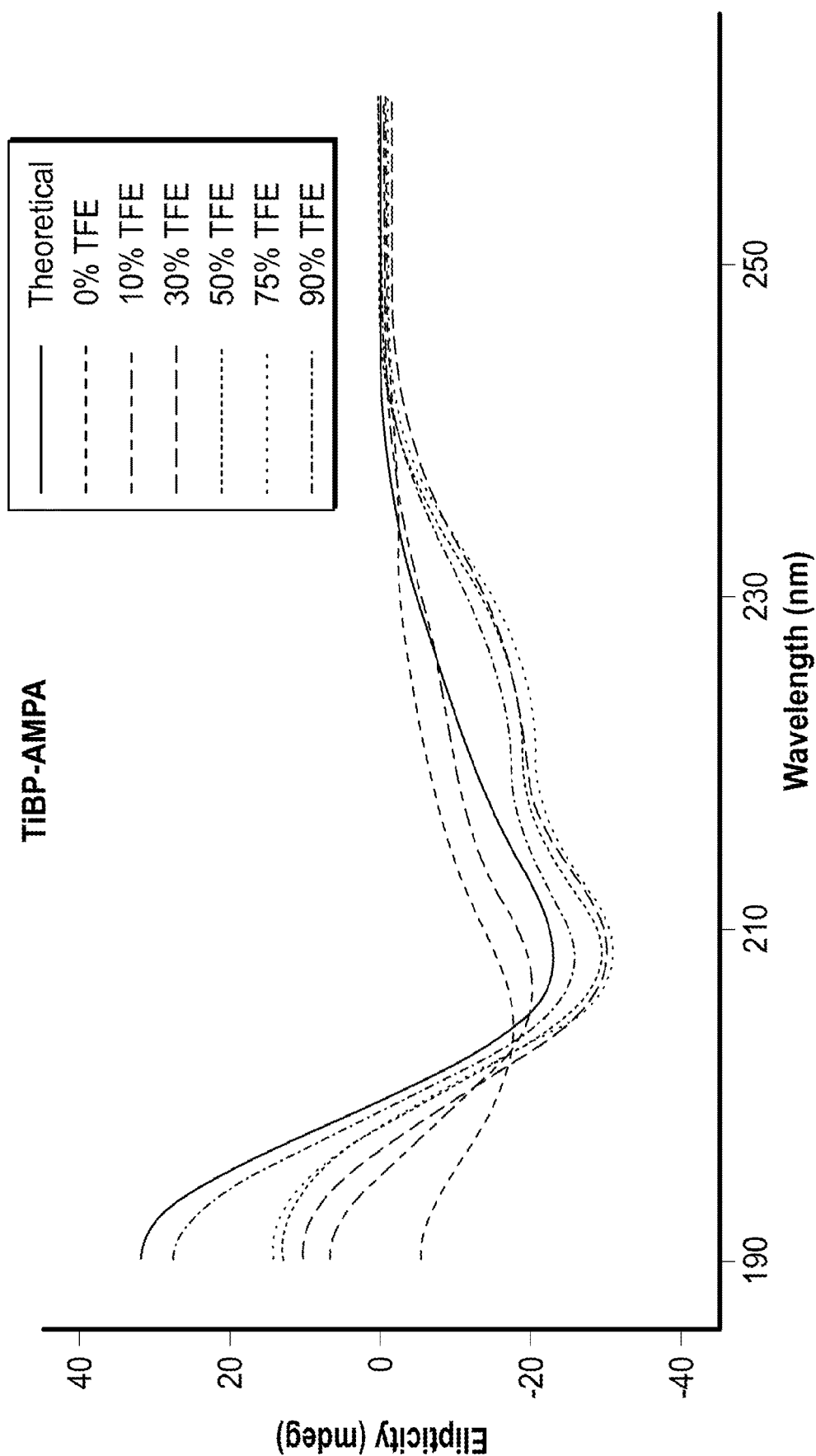
FIGS. 5A-5C depict theoretical and experimental CD spectra with deconvolution using Beta Sheet Selection (BeStSel) of a bifunctional peptide of the present technology ("TiBP-AMPA"
Figure 5B:
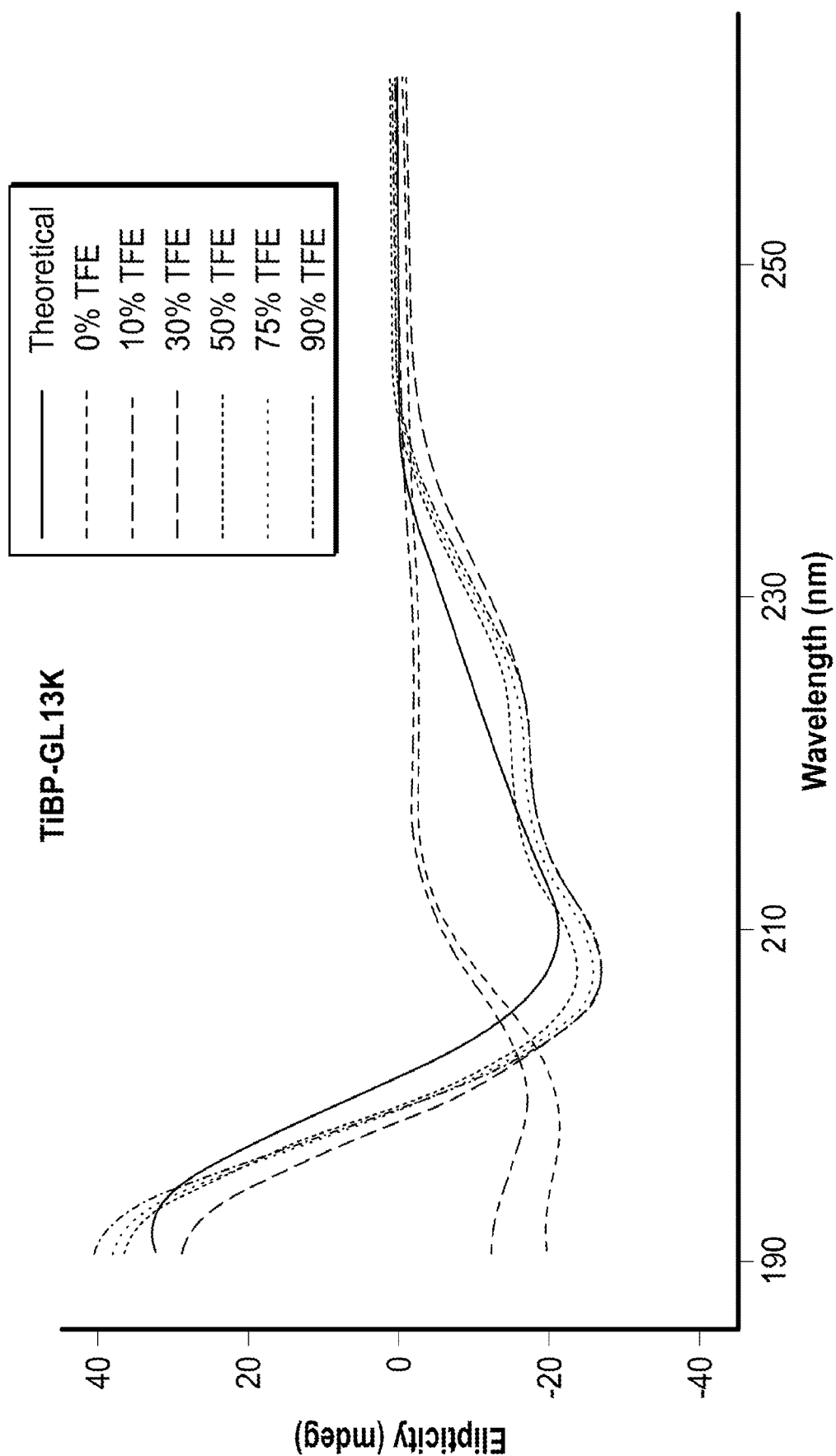
Figure 5C:
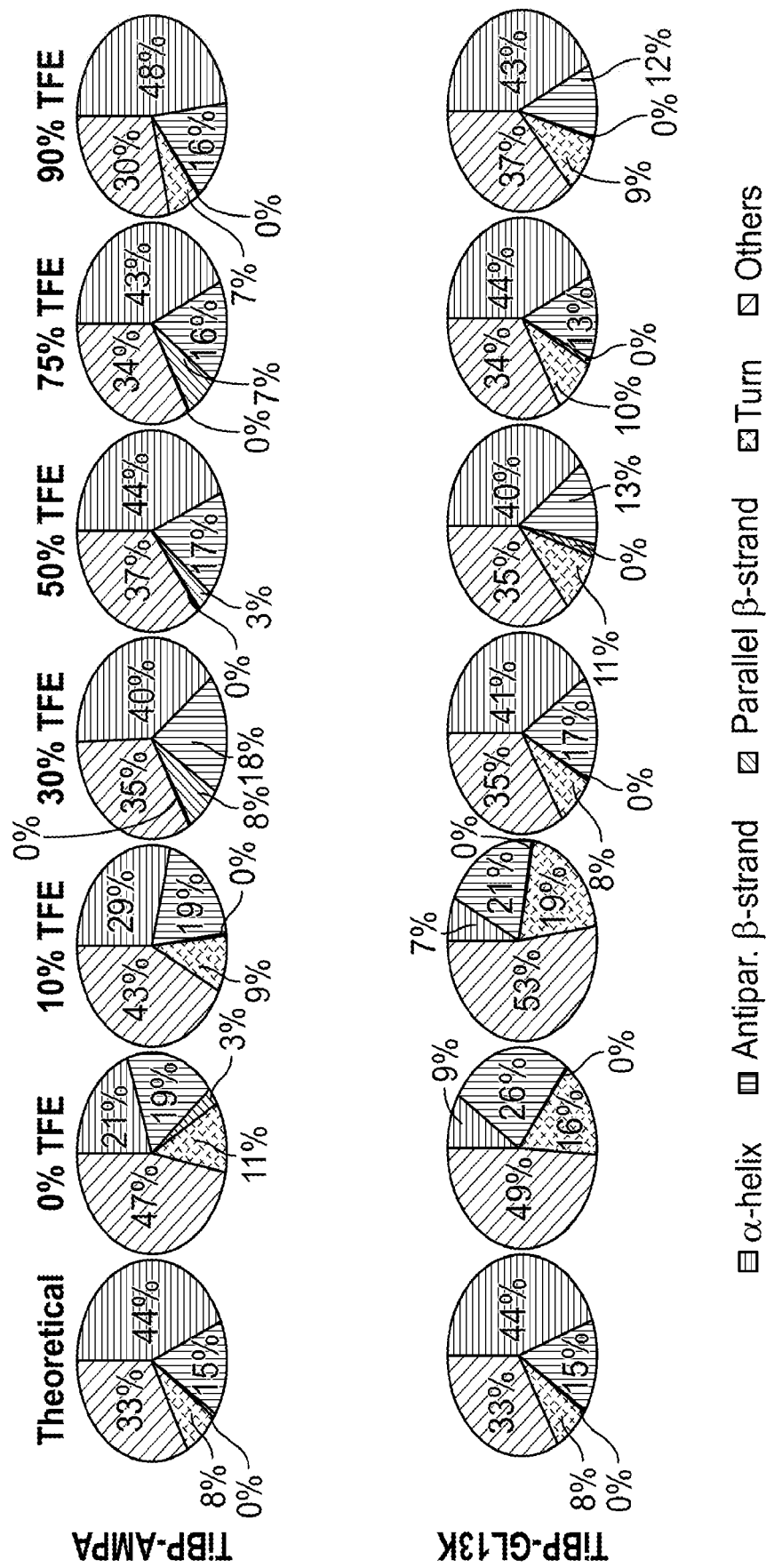

Secondary structures of the bifunctional peptides were next experimentally determined using circular dichroism (CD) spectroscopy in an aqueous environment with increasing concentrations of TFE to mimic peptide film behavior. Theoretical spectra were determined using DichroCalc[73] from the PDB files generated from the secondary structure models. The spectra plotted for each bifunctional peptide are shown in FIGS. 5A-5C.

The CD spectra were deconvoluted using Beta Sheet Selection (BeStSel), a method for secondary structure determination from CD spectra.[66] BeStSel links the CD spectra structural findings to the computational Dictionary of Protein Secondary Structure (DSSP) patterns.[90] Previously described "Rule Induction" method also relied on DSSP structure patterns and identified a pattern of 4- and 5-amino acid α-helix structures as being linked to antimicrobial activity in bifunctional peptides.[63,78] The BeStSel tool allows for deconvolution of experimental CD spectra into the structural feature patterns that are used to inform the "Rule Induction" method. Both bifunctional peptides were found to switch their conformation from an unordered state in aqueous buffers to their functionally relevant α-helical conformation in the presence of TFE. The theoretical CD spectra determined from the PDB model files more closely represented the 90% TFE environment. This suggests that the computational structural predictions are more accurate for environments similar to the conditions in which the peptides act as a film. The results from the deconvolution using BeStSel for TiBP-AMPA and TiBP-GL13K are depicted in FIG. 5C.

Theoretical Surface Coverage Determination

The concentration of bifunctional peptides theoretical needed to provide 100% surface coverage when applied onto an implant-mimicking titanium disc surface was estimated by measuring the dimensions of the binding peptide domain to obtain a theoretical "footprint" area. The resulting area was used to determine the concentration of peptide molecules required to cover a 10 mm diameter titanium implant disc (Table 3). One limitation of the theoretical surface coverage concentration calculation is that the surface is assumed to be smooth; however, the surface roughness produced by blasting an implant with titanium dioxide to promote osseous integration would result in a greater surface area than what would be calculated. This limitation was overcome by using a multiple of the theoretical binding concentration, up to 6-times (6×), to achieve near 100% surface coverage after a two-minutes binding period. Minimizing the time required to achieve complete surface functionalization by the bifunctional peptide was focused upon because this is important to translating this technology to a clinical application. The two-minute binding time frame represents a reasonable working time for application of the bifunctional peptide film in a clinical environment.

TABLE 3

Theoretical "footprint" calculation and concentrations.

| | Theoretical Footprint | | | Conc. |
|---|---|---|---|---|
| | Length (Å) | Width (Å) | Area (Å$^2$) | µM |
| TiBP-AMPA | 19.8 | 16.6 | 329 | 111 |
| TiBP-GL13K | 14.7 | 11.8 | 173 | 211 |

Evaluation of Binding, Stability and Durability

Figure 6A:
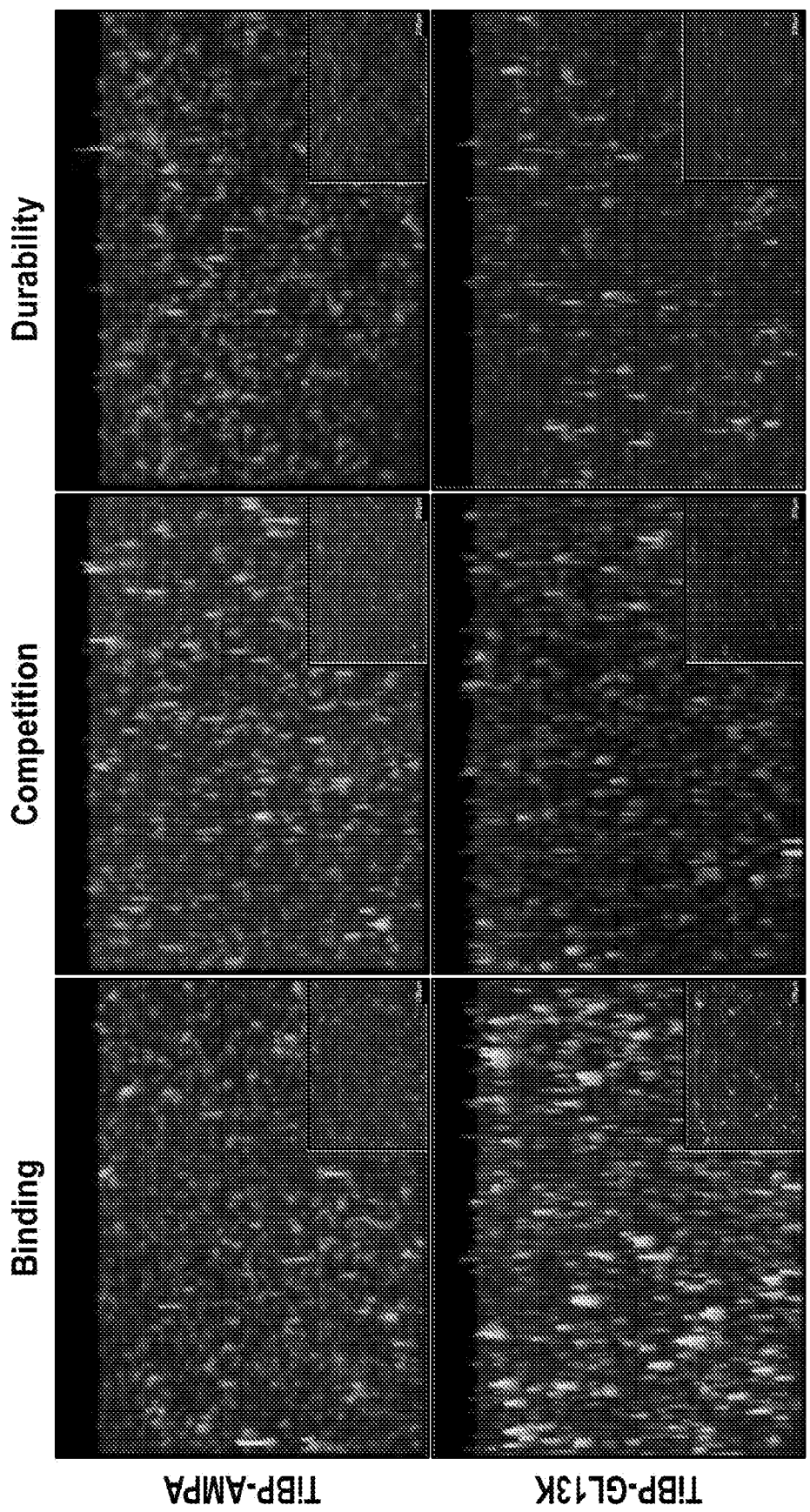
FIG. 6A depicts fluorescent microscopy images of TiBP-AMPA and comparative TiBP-GL13K, each binding to titanium implant discs, each binding with competition from BSA, and durability of each following 1 minute of brushing with an electric toothbrush.
Figure 6B:
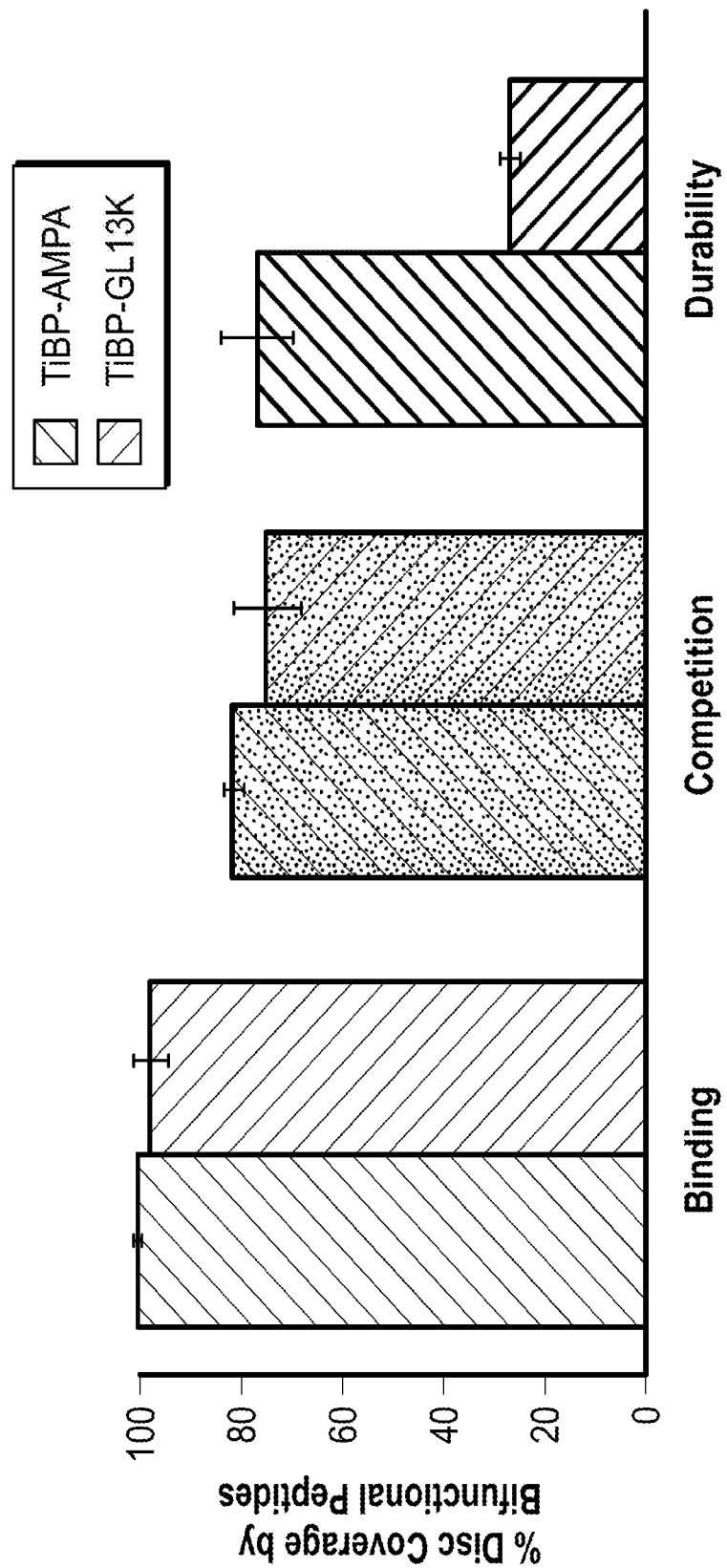
FIG. 6B provides a chart depicting the means and standard deviations of three replicate experiments for each bifunctional peptide in each condition. TiBP-AMPA binding was statistically significant compared to binding in competition with BSA and durability after 1-minute of brushing (p<0.05). Statistical significance was determined for all conditions of TiBP-GL13K bifunctional peptide (p<0.05). Statistical analysis was conducted using a one-way ANOVA.

The theoretical footprint concentration of each bifunctional peptide with a multiple of the binding concentration up to 6× was determined to result in near 100% surface coverage after incubation with a titanium implant disc for only two minutes at 37° C. Following incubation, the discs were washed to remove unbound or non-specifically bound peptide from the surface prior to imaging with a fluorescent microscope. The fluorescent images were then analyzed using a MATLAB script to determine the percentage of the implant disc covered by the bifunctional peptides. The initial binding for TiBP-AMPA resulted in 99% surface coverage after two minutes compared to 96% for TiBP-GL13K. This indicates that in a clinically achievable application, the bifunctional peptide are able to form an antibacterial film with near complete coverage of the implant surface. Representative fluorescent images for each bifunctional peptide are depicted in FIG. 6A, while the chart in FIG. 6B indicates the mean with standard deviation error bars for three replicate experiments.

The bifunctional peptide film could be applied to a new dental implant prior to implantation and subsequently during recall appointments for treatment to previously placed implants. A bifunctional peptide that retained ability to bind to the implant surface after overnight incubation in vitro after bacterial fouling and cleaning using a commercially available electric toothbrush was recently demonstrated.[78] The re-binding of the bifunctional peptide to a fouled and cleaned surface represents the feasibility of applying this technology to existing implants at recall appointments where the bifunctional peptide can be reapplied. However, when rebinding the bifunctional peptide in the oral environment, the peptide will compete for the implant surface with serum and saliva proteins, even after the implant is cleaned using standard dental practices. Thus, the ability of the peptide film to functionalize the implant surface in the presence of serum proteins was determined by pre-mixing the peptide with varying concentrations of bovine serum albumin (BSA) followed by incubating the mixture on the titanium disc for 2 minutes at 37° C. The results of the competitive binding of the bifunctional peptide in the presence of 0.01% BSA are depicted in FIG. 6. TiBP-AMPA achieved 80% surface coverage while TiBP-GL13K achieved 73% surface coverage. There was no statistical difference between the coverage achieved by the two bifunctional peptides coverage in competition with BSA.

The durability of the bifunctional peptide films was evaluated by brushing the functionalized implant discs with a commercially available electric toothbrush with a round head slightly larger than the implant disc for one minute. The presence of bifunctional peptides was determined by fluorescently imaging the discs with FITC-labeled peptides before and after brushing. The durability of the TiBP-AMPA peptide film was significantly (p<0.05) greater than that of the TiBP-GL13K peptide film. For TiBP-AMPA, 75% of the bifunctional peptide coating was retained compared to 27% for TiBP-GL13K (FIG. 6).

Evaluation of Bifunctional Peptide Designs

Figure 7A:
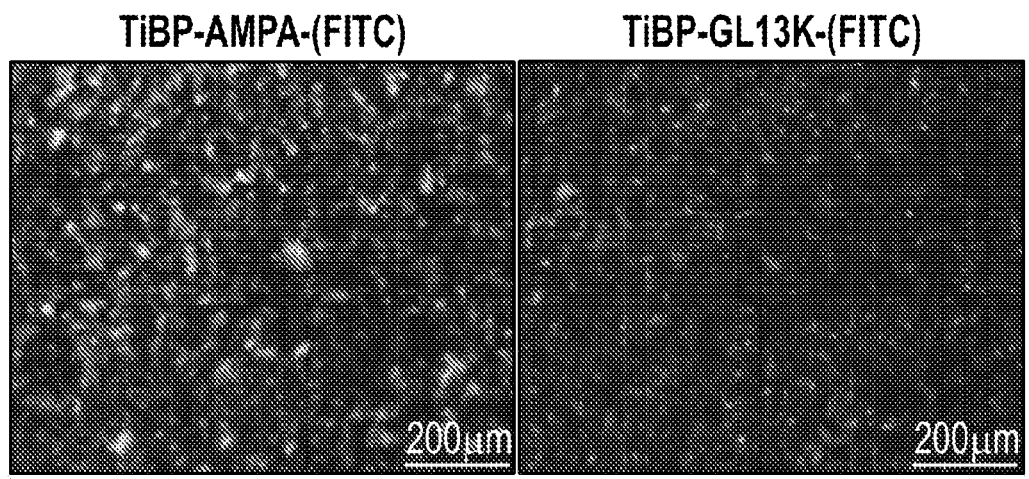
FIG. 7A depicts visualization of FITC labeled TiBP-AMPA and comparative TiBP-GL13K using fluorescence microscopy after challenge by S. mutans for 24 hours. The percentage of peptide coverage was determined by evaluating images with a MATLAB script.
Figure 7B:
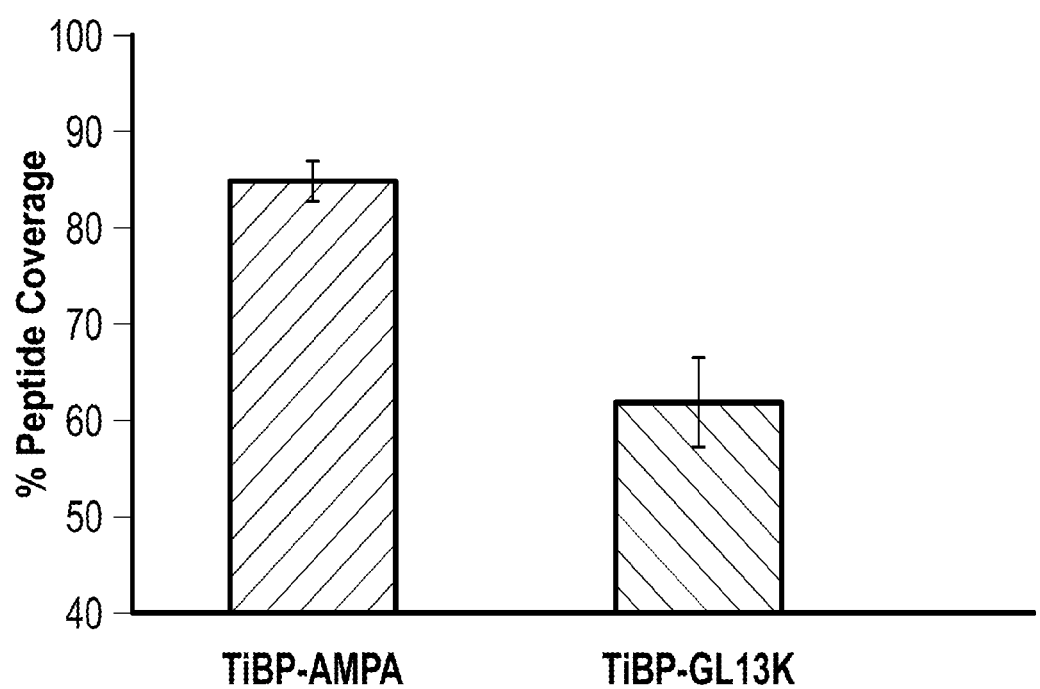
FIG. 7B provides a chart providing results obtained during three replicate experiments, of which, the fluorescence images are selected as representative of the whole. A statistically significant difference (p<0.05) was found between the means for TiBP-AMPA and TiBP-GL13K coverage using a one-way ANOVA.

The binding and antimicrobial domain activities were evaluated by challenging the bifunctional peptide film applied to titanium implant discs with S. mutans bacteria for 24 hours. The FITC-labeled bifunctional peptides were visualized on the disc surface following 24 hours of bacterial challenge using a fluorescent microscope and the surface coverage was determined using MATLAB. The surface coverage was 84% for TiBP-AMPA and 60% for TiBP-GL13K. Representative fluorescent images of FITC-labeled bifunctional peptide on the implant disc and quantification of the percent surface coverage of three replicate experiments are contained in FIGS. 7A and 7B, respectively.

The percentage of α-helical secondary structure computationally predicted by the Chou-Fasman method, the secondary structure modeling, and the experimental determination of secondary structure using CD supported the design prediction that TiBP-AMPA would outperform TiBP-GL13K in promotion of an antibacterial implant interface. The previously established "rule" method[91] was relied upon for the design of the bifunctional peptides of the present technology, taking into account the structural composition of the entire bifunctional peptide, not just the binding- or antimicrobial-domains. The rule method was trained on antimicrobial function with experimentally determined antimicrobial functions as the to identify secondary structural features in bifunctional peptides that promote formation of an effective interface for the prevention of implant associated infection.

Figure 8A:
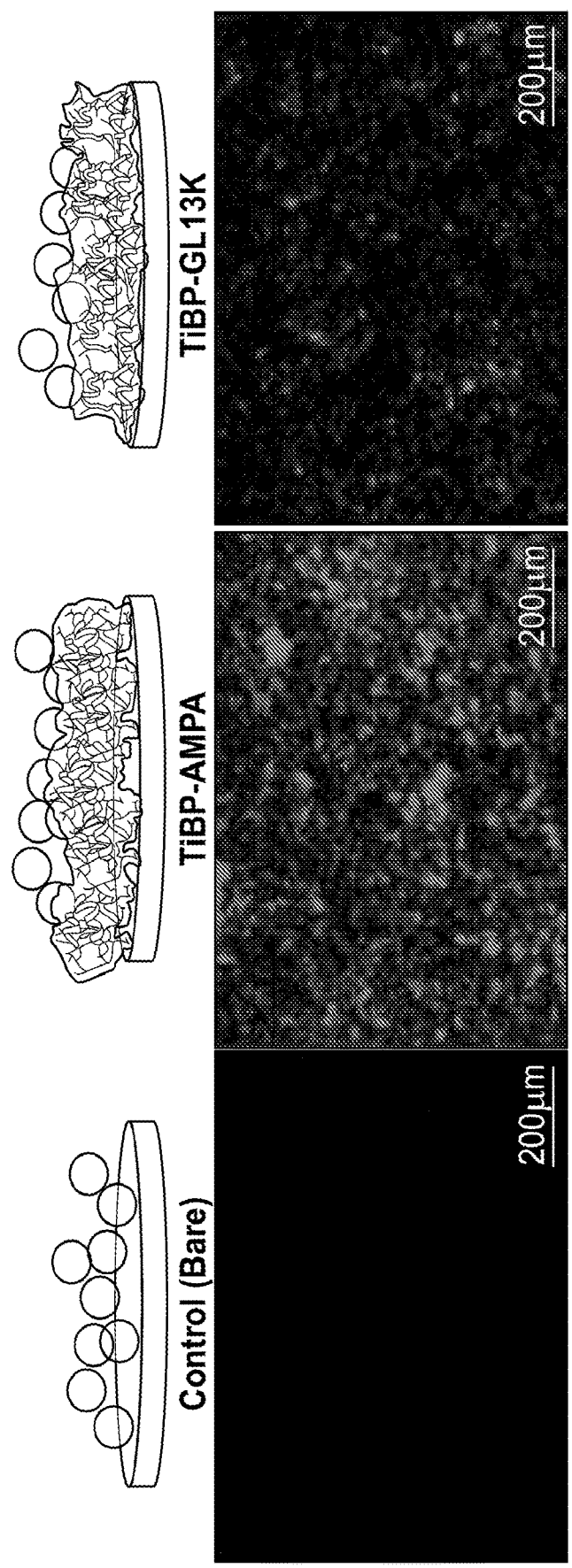
FIGS. 8A-8B depicts fluorescence microscopy images (FIG. 8A) and quantification (FIG. 8B) of propidium iodide (PI) staining of dead S. mutans bacteria on implant discs after challenge for 24 hours. Dead bacteria appear with red fluorescence. The means and standard deviations are depicted in the chart for bare, sterilized titanium discs and discs functionalized by 2 minutes of bifunctional peptide binding at 37° C. prior to bacterial challenge. Three replicate experiments were performed and a statistically significant difference (p<0.05) was observed between means using ANOVA.
Figure 8B:
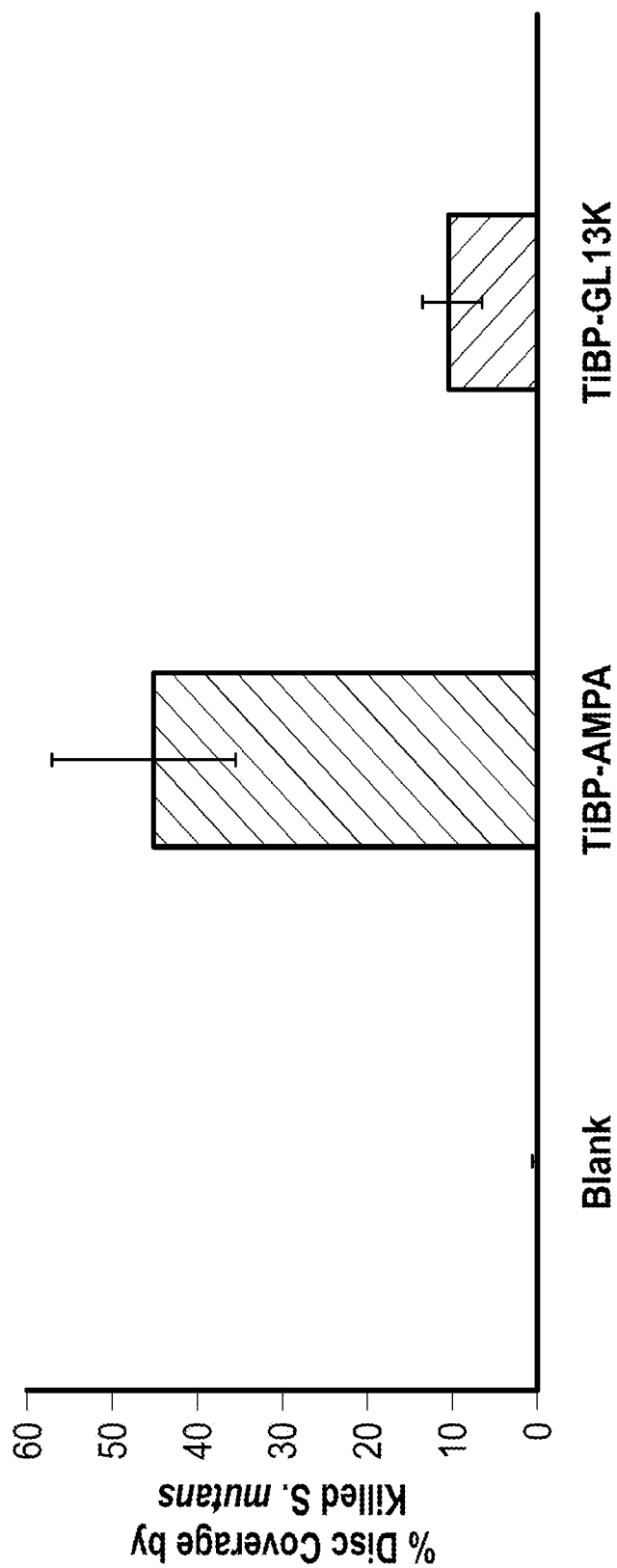

The antimicrobial functional efficacy of TiBP-AMPA compared to TiBP-GL13K supported the design prediction. The use of propidium iodide (PI) staining to identify dead bacteria on the titanium disc surface showed 46% dead bacteria coverage for TiBP-AMPA, compared to 10% dead bacteria coverage for TiBP-GL13K. Sterilized bare discs were used as controls and showed no dead bacteria. Representative fluorescent images and quantification of three replicate experiments are depicted in FIGS. 8A and 8B, respectively.

While it could be concluded that this increase in antimicrobial function could be due to the amount of bifunctional peptide remaining on the surface, e.g., 84% for TiBP-AMPA compared to 60% for TiBP-GL13K, the conservation of structure in the TiBP domain by the superimposed predicted secondary structures shown in FIG. 4 suggests equal percentages of identity or relatedness for the binding domains. However, the analysis of backbone dynamics revealed that the antimicrobial domain of TiBP-AMPA was more highly ordered than that of TiBP-GL13K. The expected disordered region represented by the TiBP in both bifunctional peptides extends through the spacer, and much of the antimicrobial domain is disordered for TiBP-GL13K. This finding could affect the anchoring of the bifunctional peptide on the disc, as the disordered region of GL13K may be more available to interact with the implant surface nonspecifically. Additionally, the proposed mechanism of antimicrobial function is more dependent on the hydrophobicity and amphipathicity of the peptide without the additional effects attributed to the increased stability and greater number of α-helical secondary structure features in the AMPA compared to Gl13K. Secondary structure modeling revealed that the AMPA domain comprised two α-helical features joined by a turn compared to only one α-helical feature for GL13K.

The hydrophobic ratio of TiBP-AMPA was slightly greater (30%) than that of TiBP-GL13K (26%). More hydrophobic residues were aligned on the same face of TiBP-AMPA, with 10 residues being aligned for TiBP-AMPA compared to only 5 residues for TiBP-GL13K. With regard to hydrophobicity and amphipathicity, the design prediction based on the sequence and structure supported the experimental finding that TiBP-AMPA has greater antimicrobial activity than TiBP-Gl13K.

Taken together, these experimental results demonstrate that using computationally efficient, less resource-intensive methods can be used to successfully predict the properties of bifunctional peptide prior to more costly and time-consuming experimental evaluation. The computational design approach was validated experimentally by assessing the binding and antimicrobial function of bifunctional peptides on a simulated implant surface. This technology and approach to design represents a new strategy to improving and developing bifunctional peptide films to combat bacterial infection and prevent/treat peri-implant disease. Additionally, the incorporation of AMP sequences not previously explored as antimicrobial agents in bifunctional peptides represents an opportunity to develop more broad-spectrum antibacterial efficacy, as well as options for treatment of antibiotic resistant bacterial strains. The predictive design approach disclosed herein offers a method for evaluating the functional efficacy of AMP, spacer, and binding domain combinations based on analyses of the relationship between sequence, structure, and function.

In conclusion, a predictive computational approach was developed for designing bifunctional peptides that sought to correlate structure and function, e.g., antimicrobial activity, and demonstrated that the resulting peptides show promise as a medicinal approach to addressing bacterial dysbiogenesis[92-93] that leads to peri-implant disease with a shortening of the useful life of dental implants. With over 3 million implants placed in the US alone and growing by 500,000 implants/year[7], a reduced service life ending in implant failure will adversely impact public health. The rapid (two minute) delivery of antimicrobial bifunctional peptide films was tested on dental implant surfaces mimicking the application sequence necessary for re-treatment of peri-implantitis in a dental office.[59] The designed functional peptides consisted of three domains, from the N-terminus: titanium binding, spacer and antimicrobial.

While the antimicrobial peptides were varied, the binding and spacer domains were kept constant with the goal of demonstrating that a computational approach can predict the antimicrobial properties of the resulting bifunctional peptide films. The percentage of α-helicity of the bifunctional peptides and their individual constituting domains were computationally predicted by the Chou-Fasman algorithm. The peptides were further analyzed using chimera secondary structure models and these secondary structure predictions were compared experimentally using CD spectroscopy. This predictive design approach considered the structure and function of the entire bifunctional peptide molecule. Three design methods were used here, namely sequence-based, de novo modeling, and experimental evaluation; all indicated that peptide incorporating the AMPA anti-microbial domain had greater helical content than the one containing the GL13K antimicrobial domain. This prediction was confirmed by the backbone dynamic data. This ensemble of structural analysis techniques formed the basis for the prediction that TiBP-AMPA would functionally outperform TiBP-GL13K as an antimicrobial peptide film. In particular, amphipathic and α-helicity were shown to be more prominent in ordered regions, which contribute to greater antimicrobial peptide film activity. The bifunctional peptides were evaluated experimentally for their potential to prevent and treat peri-implant disease. The bifunctional peptides were delivered in the clinically relevant manner 2 minute binding period, under competition with serum proteins. Their mechanical durability was tested, and they were empirically challenged with bacteria to confirm the computational predictions. The peptide films have been shown capable of rebinding ability through up to five cycles of bacterial fouling, cleaning and reapplication. These results demonstrate the success of the computational design approach described herein and support the use of TiBP-AMPA peptide as a treatment for peri-implant disease due to its ability mitigate bacterial biofilm formation.

REFERENCES

1. Aparicio, C.; Gil, F. J.; Fonseca, C.; Barbosa, M.; Planell, J. A., Corrosion behavior of commercially pure titanium shot blasted with different materials and sizes of shot particles for dental implant applications. Biomaterials 2003, 24 (2), 263-73.
2. Ronold, H. J.; Ellingsen, J. E.; Lyngstadaas, S. P., Tensile force testing of optimized coin-shaped titanium implant attachment kinetics in the rabbit tibiae. J Mater Sci Mater Med 2003, 14 (10), 843-9.
3. Ronold, H. J.; Lyngstadaas, S. P.; Ellingsen, J. E., A study on the effect of dual blasting with $TiO_2$ on titanium implant surfaces on functional attachment in bone. J Biomed Mater Res A 2003, 67 (2), 524-30. DOI: 10.1002/jbm.a.10580.
4. Ronold, H. J.; Lyngstadaas, S. P.; Ellingsen, J. E., Analysing the optimal value for titanium implant roughness in bone attachment using a tensile test. Biomaterials 2003, 24 (25), 4559-64.

5. Norowski, P. A., Jr.; Bumgardner, J. D., Biomaterial and antibiotic strategies for peri-implantitis: a review. J Biomed Mater Res B Appl Biomater 2009, 88 (2), 530-43. DOI: 10.1002/jbm.b.31152.
6. Aparicio, C.; Padros, A.; Gil, F. J., In vivo evaluation of micro-rough and bioactive titanium dental implants using histometry and pull-out tests. Journal of the mechanical behavior of biomedical materials 2011, 4 (8), 1672-82. DOI: 10.1016/j.jmbbm.2011.05.005.
7. Achermann G, How will dentistry look in 2020? In Vision 2020: Simply doing more for dental professionals, The Straumann Group: Amsterdam, 2012; p http://www.straumann.com.
8. Monjo, M.; Ramis, J. M.; Ronold, H. J.; Taxt-Lamolle, S. F.; Ellingsen, J. E.; Lyngstadaas, S. P., Correlation between molecular signals and bone bonding to titanium implants. Clinical oral implants research 2013, 24 (9), 1035-43. DOI: 10.1111/j.1600-0501.2012.02496.x.
9. Orsini, G.; Pagella, P.; Mitsiadis, T. A., Modern Trends in Dental Medicine: An Update for Internists. Am J Med 2018, 131 (12), 1425-1430. DOI: 10.1016/j.amjmed.2018.05.042.
10. Gungormus, M.; Oren, E. E.; Horst, J. A.; Fong, H.; Hnilova, M.; Somerman, M. J.; Snead, M. L.; Samudrala, R.; Tamerler, C.; Sarikaya, M., Cementomimetics-constructing a cementum-like biomineralized microlayer via amelogenin-derived peptides. International journal of oral science 2012, 4 (2), 69-77. DOI: 10.1038/ijos.2012.40.
11. Zhou, Y.; Snead, M. L.; Tamerler, C., Bio-inspired hard-to-soft interface for implant integration to bone. Nanomedicine 2015, 11 (2), 431-4. DOI: 10.1016/j.nano.2014.10.003.
12. Lopez-Piriz, R.; Cabal, B.; Goyos-Ball, L.; Fernandez, A.; Bartolome, J. F.; Moya, J. S.; Torrecillas, R., Current state-of-the-art and future perspectives of the three main modern implant-dentistry concerns: Aesthetic requirements, mechanical properties, and peri-implantitis prevention. J Biomed Mater Res A 2019, 107 (7), 1466-1475. DOI: 10.1002/jbm.a.36661.
13. Olivares-Navarrete, R.; Hyzy, S. L.; Park, J. H.; Dunn, G. R.; Haithcock, D. A.; Wasilewski, C. E.; Boyan, B. D.; Schwartz, Z., Mediation of osteogenic differentiation of human mesenchymal stem cells on titanium surfaces by a Wnt-integrin feedback loop. Biomaterials 2011, 32 (27), 6399-411. DOI: 10.1016/j.biomaterials.2011.05.036.
14. Tarnow, D. P., Increasing Prevalence of Peri-implantitis: How Will We Manage? J Dent Res 2016, 95 (1), 7-8. DOI: 10.1177/0022034515616557.
15. Valente, N. A.; Andreana, S., Peri-implant disease: what we know and what we need to know. J Periodontal Implant Sci 2016, 46 (3), 136-51. DOI: 10.5051/jpis.2016.46.3.136.
16. Salvi, G. E.; Cosgarea, R.; Sculean, A., Prevalence and Mechanisms of Peri-implant Diseases. J Dent Res 2017, 96 (1), 31-37. DOI: 10.1177/0022034516667484.
17. Berglundh, T.; Armitage, G.; Araujo, M. G.; Avila-Ortiz, G.; Blanco, J.; Camargo, P. M.; Chen, S.; Cochran, D.; Derks, J.; Figuero, E.; Hammerle, C. H. F.; Heitz-Mayfield, L. J. A.; Huynh-Ba, G.; Iacono, V.; Koo, K. T.; Lambert, F.; McCauley, L.; Quirynen, M.; Renvert, S.; Salvi, G. E.; Schwarz, F.; Tarnow, D.; Tomasi, C.; Wang, H. L.; Zitzmann, N., Peri-implant diseases and conditions: Consensus report of workgroup 4 of the 2017 World Workshop on the Classification of Periodontal and Peri-Implant Diseases and Conditions. J Periodontol 2018, 89 Suppl 1, S313-S318. DOI: 10.1002/JPER.17-0739.
18. Caton, J. G.; Armitage, G.; Berglundh, T.; Chapple, I. L. C.; Jepsen, S.; Kornman, K. S.; Mealey, B. L.; Papapanou, P. N.; Sanz, M.; Tonetti, M. S., A new classification scheme for periodontal and peri-implant diseases and conditions—Introduction and key changes from the 1999 classification. Journal of Periodontology 2018, 89, S1-S8. DOI: 10.1002/Jper.18-0157.
19. Listgarten, M. A.; Lai, C. H., Comparative microbiological characteristics of failing implants and periodontally diseased teeth. Journal of Periodontology 1999, 70 (4), 431-437. DOI: DOI 10.1902/jop.1999.70.4.431.
20. Hultin, M.; Gustafsson, A.; Hallstrom, H.; Johansson, L. A.; Ekfeldt, A.; Klinge, B., Microbiological findings and host response in patients with peri-implantitis. Clinical oral implants research 2002, 13 (4), 349-358. DOI: DOI 10.1034/j.1600-0501.2002.130402.x.
21. Quirynen, M.; Vogels, R.; Peeters, W.; Steenberghe, D.; Naert, I.; Haffajee, A., Dynamics of initial subgingival colonization of 'pristine' peri-implant pockets. Clinical oral implants research 2006, 17 (1), 25-37. DOI: 10.1111/j.1600-0501.2005.01194.x.
22. Dutzan, N.; Kajikawa, T.; Abusleme, L.; Greenwell-Wild, T.; Zuazo, C. E.; Ikeuchi, T.; Brenchley, L.; Abe, T.; Hurabielle, C.; Martin, D.; Morell, R. J.; Freeman, A. F.; Lazarevic, V.; Trinchieri, G.; Diaz, P. I.; Holland, S. M.; Belkaid, Y.; Hajishengallis, G.; Moutsopoulos, N. M., A dysbiotic microbiome triggers TH17 cells to mediate oral mucosal immunopathology in mice and humans. Science translational medicine 2018, 10 (463). DOI: 10.1126/scitranslmed.aat0797.
23. Derks, J.; Schaller, D.; Hakansson, J.; Wennstrom, J. L.; Tomasi, C.; Berglundh, T., Peri-implantitis—onset and pattern of progression. J Clin Periodontol 2016, 43 (4), 383-8. DOI: 10.1111/jcpe.12535.
24. Lang, N. P.; Wilson, T. G.; Corbet, E. F., Biological complications with dental implants: their prevention, diagnosis and treatment. Clinical oral implants research 2000, 11 Suppl 1, 146-55.
25. Carral, C.; Munoz, F.; Permuy, M.; Linares, A.; Dard, M.; Blanco, J., Mechanical and chemical implant decontamination in surgical peri-implantitis treatment: preclinical "in vivo" study. J Clin Periodontol 2016, 43 (8), 694-701. DOI: 10.1111/jcpe.12566.
26. Wimley, W. C.; Hristova, K., Antimicrobial peptides: successes, challenges and unanswered questions. J Membr Biol 2011, 239 (1-2), 27-34. DOI: 10.1007/s00232-011-9343-0.
27. Hvistendahl, M., Public health. China takes aim at rampant antibiotic resistance. Science 2012, 336 (6083), 795. DOI: 10.1126/science.336.6083.795.
28. Pruden, A., Balancing water sustainability and public health goals in the face of growing concerns about antibiotic resistance. Environmental science & technology 2013, 48 (1), 5-14.
29. Tones, M. D. T.; Sothiselvam, S.; Lu, T. K.; de la Fuente-Nunez, C., Peptide Design Principles for Antimicrobial Applications. Journal of molecular biology 2019. DOI: 10.1016/j.jmb.2018.12.015.
30. Mao, J.; Kuranaga, T.; Hamamoto, H.; Sekimizu, K.; Inoue, M., Rational design, synthesis, and biological evaluation of lactam-bridged gramicidin A analogues: discovery of a low-hemolytic antibacterial peptide. ChemMedChem 2015, 10 (3), 540-5. DOI: 10.1002/cmdc.201402473.
31. Costerton, J. W.; Stewart, P. S.; Greenberg, E. P., Bacterial biofilms: a common cause of persistent infections. Science 1999, 284 (5418), 1318-22.

32. Salwiczek, M.; Qu, Y.; Gardiner, J.; Strugnell, R. A.; Lithgow, T.; McLean, K. M.; Thissen, H., Emerging rules for effective antimicrobial coatings. Trends Biotechnol 2014, 32 (2), 82-90. DOI: 10.1016/j.tibtech.2013.09.008.
33. Raphel, J.; Holodniy, M.; Goodman, S. B.; Heilshorn, S. C., Multifunctional coatings to simultaneously promote osseointegration and prevent infection of orthopaedic implants. Biomaterials 2016, 84, 301-314. DOI: 10.1016/j.biomaterials.2016.01.016.
34. Tobin, E. J., Recent coating developments for combination devices in orthopedic and dental applications: A literature review. Adv Drug Deliv Rev 2017, 112, 88-100. DOI: 10.1016/j.addr.2017.01.007.
35. Zilberman, M.; Elsner, J. J., Antibiotic-eluting medical devices for various applications. Journal of Controlled Release 2008, 130 (3), 202-215.
36. Pritchard, E. M.; Valentin, T.; Panilaitis, B.; Omenetto, F.; Kaplan, D. L., Antibiotic-Releasing Silk Biomaterials for Infection Prevention and Treatment. Advanced functional materials 2013, 23 (7), 854-861.
37. Fjell, C. D.; Hiss, J. A.; Hancock, R. E.; Schneider, G., Designing antimicrobial peptides: form follows function. Nat Rev Drug Discov 2011, 11 (1), 37-51. DOI: 10.1038/nrd3591.
38. Wang, G.; Li, X.; Wang, Z., APD3: the antimicrobial peptide database as a tool for research and education. Nucleic Acids Res 2016, 44 (D1), D1087-93. DOI: 10.1093/nar/gkv1278.
39. Boone, K.; Camarda, K.; Spencer, P.; Tamerler, C., Antimicrobial peptide similarity and classification through rough set theory using physicochemical boundaries. BMC Bioinformatics 2018, 19 (1), 469. DOI: 10.1186/s12859-018-2514-6.
40. Bayramov, D. F.; Neff, J. A., Beyond conventional antibiotics—New directions for combination products to combat biofilm. Adv Drug Deliv Rev 2017, 112, 48-60. DOI: 10.1016/j.addr.2016.07.010.
41. Eckert, R., Road to clinical efficacy: challenges and novel strategies for antimicrobial peptide development. Future Microbiol 2011, 6 (6), 635-51. DOI: 10.2217/fmb.11.27.
42. Holmberg, K. V.; Abdolhosseini, M.; Li, Y.; Chen, X.; Gorr, S. U.; Aparicio, C., Bio-inspired stable antimicrobial peptide coatings for Dental applications. Acta Biomater 2013, 9 (9), 8224-31. DOI: 10.1016/j.actbio.2013.06.017.
43. Godoy-Gallardo, M.; Mas-Moruno, C.; Fernandez-Calderon, M. C.; Perez-Giraldo, C.; Manero, J. M.; Albericio, F.; Gil, F. J.; Rodriguez, D., Covalent immobilization of hLf1-11 peptide on a titanium surface reduces bacterial adhesion and biofilm formation. Acta Biomater 2014, 10 (8), 3522-34. DOI: 10.1016/j.actbio.2014.03.026.
44. Chen, R.; Willcox, M. D.; Ho, K. K.; Smyth, D.; Kumar, N., Antimicrobial peptide melamine coating for titanium and its in vivo antibacterial activity in rodent subcutaneous infection models. Biomaterials 2016, 85, 142-51. DOI: 10.1016/j.biomaterials.2016.01.063.
45. Chouirfa, H.; Bouloussa, H.; Migonney, V.; Falentin-Daudre, C., Review of titanium surface modification techniques and coatings for antibacterial applications. Acta Biomater 2019, 83, 37-54. DOI: 10.1016/j.actbio.2018.10.036.
46. Moussa, D. G.; Fok, A.; Aparicio, C., Hydrophobic and antimicrobial dentin: A peptide-based 2-tier protective system for dental resin composite restorations. Acta Biomater 2019, 88, 251-265. DOI:10.1016/j.actbio.2019.02.007.
47. Moussa, D. G.; Kirihara, J. A.; Ye, Z.; Fischer, N. G.; Khot, J.; Witthuhn, B. A.; Aparicio, C., Dentin Priming with Amphipathic Antimicrobial Peptides. J Dent Res 2019, 22034519863772. DOI: 10.1177/0022034519863772.
48. Sarikaya, M.; Tamerler, C.; Jen, A. K.; Schulten, K.; Baneyx, F., Molecular biomimetics: nanotechnology through biology. Nat Mater 2003, 2 (9), 577-85. DOI: 10.1038/nmat964.
49. Peelle, B. R.; Krauland, E. M.; Wittrup, K. D.; Belcher, A. M., Design criteria for engineering inorganic material-specific peptides. Langmuir 2005, 21 (15), 6929-33. DOI: 10.1021/la050261s.
50. Heinz, H.; Farmer, B. L.; Pandey, R. B.; Slocik, J. M.; Patnaik, S. S.; Pachter, R.; Naik, R. R., Nature of molecular interactions of peptides with gold, palladium, and Pd—Au bimetal surfaces in aqueous solution. J Am Chem Soc 2009, 131 (28), 9704-14. DOI: 10.1021/ja900531f.
51. Puddu, V.; Slocik, J. M.; Naik, R. R.; Perry, C. C., Titania binding peptides as templates in the biomimetic synthesis of stable titania nanosols: insight into the role of buffers in peptide-mediated mineralization. Langmuir 2013, 29 (30), 9464-72. DOI: 10.1021/la401777x.
52. Walsh, T. R.; Knecht, M. R., Biointerface Structural Effects on the Properties and Applications of Bioinspired Peptide-Based Nanomaterials. Chem Rev 2017, 117 (20), 12641-12704. DOI: 10.1021/acs.chemrev.7b00139.
53. Tamerler, C.; Sarikaya, M., Genetically designed Peptide-based Molecular materials. ACS Nano 2009, 3 (7), 1606-15. DOI: 10.1021/nn900720g.
54. Kacar, T.; Zin, M. T.; So, C.; Wilson, B.; Ma, H.; Gul-Karaguler, N.; Jen, A. K.; Sarikaya, M.; Tamerler, C., Directed self-immobilization of alkaline phosphatase on micro-patterned substrates via genetically fused metal-binding peptide. Biotechnol Bioeng 2009, 103 (4), 696-705. DOI: 10.1002/bit.22282.
55. Tamerler, C.; Khatayevich, D.; Gungormus, M.; Kacar, T.; Oren, E. E.; Hnilova, M.; Sarikaya, M., Molecular biomimetics: GEPI-based biological routes to technology. Biopolymers 2010, 94 (1), 78-94. DOI: 10.1002/bip.21368.
56. Gungormus, M.; Branco, M.; Fong, H.; Schneider, J. P.; Tamerler, C.; Sarikaya, M., Self assembled bi-functional peptide hydrogels with biomineralization-directing peptides. Biomaterials 2010, 31 (28), 7266-74. DOI: 10.1016/j.biomaterials.2010.06.010.
57. Van Oosten, S. K.; Yuca, E.; Karaca, B. T.; Boone, K.; Snead, M. L.; Spencer, P.; Tamerler, C., Biosilver nanoparticle interface offers improved cell viability. Surf Innov 2016, 4 (3), 121-132. DOI: 10.1680/jsuin.16.00010.
58. Yazici, H.; Fong, H.; Wilson, B.; Oren, E. E.; Amos, F. A.; Zhang, H.; Evans, J. S.; Snead, M. L.; Sarikaya, M.; Tamerler, C., Biological response on a titanium implant-grade surface functionalized with modular peptides. Acta Biomater. 2013, 9 (2), 5341-5352. DOI: 10.1016/j.actbio.2012.11.004.
59. Wisdom, C.; Chen, C.; Yuca, E.; Zhou, Y.; Tamerler, C.; Snead, M. L., Repeatedly Applied Peptide Film Kills Bacteria on Dental Implants. JOM (1989) 2019, 71 (4), 1271-1280. DOI: 10.1007/s11837-019-03334-w.
60. Warotayanont, R.; Zhu, D.; Snead, M. L.; Zhou, Y., Leucine-rich amelogenin peptide induces osteogenesis in mouse embryonic stem cells. Biochem Biophys Res Commun 2008, 367 (1), 1-6.
61. Warotayanont, R.; Frenkel, B.; Snead, M. L.; Zhou, Y., Leucine-rich amelogenin peptide induces osteogenesis by activation of the Wnt pathway. Biochem Biophys Res Commun 2009, (25), 558-563.
62. Yazici, H.; O'Neill, M. B.; Kacar, T.; Wilson, B. R.; Oren, E. E.; Sarikaya, M.; Tamerler, C., Engineered Chimeric Peptides as Antimicrobial Surface Coating Agents toward Infection-Free Implants. ACS Appl Mater Interfaces 2016, 8 (8), 5070-81. DOI: 10.1021/acsami.5b03697.
63. Yucesoy, D. T.; Hnilova, M.; Boone, K.; Arnold, P. M.; Snead, M. L.; Tamerler, C., Chimeric peptides as implant functionalization agents for titanium alloy implants with antimicrobial properties. JOM 2015, 67 (4), 754-766. DOI: 10.1007/s11837-015-1350-7.
64. Wisdom, C., VanOosten, S. K., Boone, K. W., Khvostenko, D., Arnold, P. M., Snead, M. L., and Tamerler, C., Controlling the Biomimetic Implant Interface: Modulating Antimicrobial Activity by Spacer Design. Journal of Molecular and Engineering Materials 2016, 4 (1), 164005-1-16405-15. DOI: 10.1142/S2251237316400050.
65. Wilkins, M. R.; Gasteiger, E.; Bairoch, A.; Sanchez, J. C.; Williams, K. L.; Appel, R. D.; Hochstrasser, D. F., Protein identification and analysis tools in the ExPASy server. Methods in molecular biology 1999, 112, 531-52.
66. Micsonai, A.; Wien, F.; Bulyaki, E.; Kun, J.; Moussong, E.; Lee, Y. H.; Goto, Y.; Refregiers, M.; Kardos, J., BeStSel: a web server for accurate protein secondary structure prediction and fold recognition from the circular dichroism spectra. Nucleic Acids Res 2018, 46 (W1), W315-W322. DOI: 10.1093/nar/gky497.
67. Wiedemann, C.; Bellstedt, P.; Gorlach, M., CAPITO—a web server-based analysis and plotting tool for circular dichroism data. Bioinformatics 2013, 29 (14), 1750-7. DOI: 10.1093/bioinformatics/btt278.
68. Thevenet, P.; Shen, Y. M.; Maupetit, J.; Guyon, F.; Derreumaux, P.; Tuffery, P., PEP-FOLD: an updated de novo structure prediction server for both linear and disulfide bonded cyclic peptides. Nucleic Acids Research 2012, 40 (W1), W288-W293. DOI: 10.1093/nar/gks419.
69. Shen, Y. M.; Maupetit, J.; Derreumaux, P.; Tuffery, P., Improved PEP-FOLD Approach for Peptide and Miniprotein Structure Prediction. J Chem Theory Comput 2014, 10 (10), 4745-4758. DOI: 10.1021/ct500592m.
70. Maupetit, J.; Derreumaux, P.; Tuffery, P., PEP-FOLD: an online resource for de novo peptide structure prediction. Nucleic Acids Research 2009, 37, W498-W503. DOI: 10.1093/nar/gkp323.
71. Cilia, E.; Pancsa, R.; Tompa, P.; Lenaerts, T.; Vranken, W. F., The DynaMine webserver: predicting protein dynamics from sequence. Nucleic Acids Res 2014, 42 (Web Server issue), W264-70. DOI: 10.1093/nar/gku270.
72. Pettersen, E. F.; Goddard, T. D.; Huang, C. C.; Couch, G. S.; Greenblatt, D. M.; Meng, E. C.; Ferrin, T. E., UCSF chimera—A visualization system for exploratory research and analysis. Journal of Computational Chemistry 2004, 25 (13), 1605-1612. DOI: 10.1002/jcc.20084.
73. Bulheller, B. M.; Hirst, J. D., DichroCalc—circular and linear dichroism online. Bioinformatics 2009, 25 (4), 539-40. DOI: 10.1093/bioinformatics/btp016.
74. Wiedemann, C.; Bellstedt, P.; Gorlach, M., CAPITO—a web server-based analysis and plotting tool for circular dichroism data. Bioinformatics 2013, 29 (14), 1750-1757. DOI: 10.1093/bioinformatics/btt278.
75. Ji, S.; Li, W.; Zhang, L.; Zhang, Y.; Cao, B., Cecropin A-melittin mutant with improved proteolytic stability and enhanced antimicrobial activity against bacteria and fungi associated with gastroenteritis in vitro. Biochem Biophys Res Commun 2014, 451 (4), 650-5. DOI: 10.1016/j.bbrc.2014.08.044.
76. Chen, X.; Hirt, H.; Li, Y.; Gorr, S. U.; Aparicio, C., Antimicrobial GL13K peptide coatings killed and ruptured the wall of Streptococcus gordonii and prevented formation and growth of biofilms. PLoS One 2014, 9 (11), e111579. DOI: 10.1371/journal.pone.0111579.
77. Wisdom, C.; VanOosten, S. K.; BOONE, K.; Khvostenko, D.; Arnold, P. M.; Snead, M. L.; Tamerler, C., Controlling the Biomimetic Implant Interface: Modulating Antimicrobial Activity by Spacer Design. Journal of Molecular and Engineering Materials 2016.
78. Wisdom, C.; VanOosten, S. K.; Boone, K. W.; Khvostenko, D.; Arnold, P. M.; Snead, M. L.; Tamerler, C., Controlling the Biomimetic Implant Interface: Modulating Antimicrobial Activity by Spacer Design. J Mol Eng Mater 2016, 4 (1). DOI: 10.1142/S2251237316400050.
79. Zhu, X.; Zhang, L.; Wang, J.; Ma, Z.; Xu, W.; Li, J.; Shan, A., Characterization of antimicrobial activity and mechanisms of low amphipathic peptides with different alpha-helical propensity. Acta Biomater 2015, 18, 155-67. DOI: 10.1016/j.actbio.2015.02.023.
80. Wang, J.; Dou, X.; Song, J.; Lyu, Y.; Zhu, X.; Xu, L.; Li, W.; Shan, A., Antimicrobial peptides: Promising alternatives in the post feeding antibiotic era. Med Res Rev 2019, 39 (3), 831-859. DOI: 10.1002/med.21542.
81. Cilia, E.; Pancsa, R.; Tompa, P.; Lenaerts, T.; Vranken, W. F., From protein sequence to dynamics and disorder with DynaMine. Nat Commun 2013, 4, 2741. DOI: 10.1038/ncomms3741.
82. Schwarz, F.; Derks, J.; Monje, A.; Wang, H. L., Peri-implantitis. J Periodontol 2018, 89 Suppl 1, S267-S290. DOI: 10.1002/JPER.16-0350.
83. Chapple, I. L. C.; Mealey, B. L.; Van Dyke, T. E.; Bartold, P. M.; Dommisch, H.; Eickholz, P.; Geisinger, M. L.; Genco, R. J.; Glogauer, M.; Goldstein, M.; Griffin, T. J.; Holmstrup, P.; Johnson, G. K.; Kapila, Y.; Lang, N. P.; Meyle, J.; Murakami, S.; Plemons, J.; Romito, G. A.; Shapira, L.; Tatakis, D. N.; Teughels, W.; Trombelli, L.; Walter, C.; Wimmer, G.; Xenoudi, P.; Yoshie, H., Periodontal health and gingival diseases and conditions on an intact and a reduced periodontium: Consensus report of workgroup 1 of the 2017 World Workshop on the Classification of Periodontal and Peri-Implant Diseases and Conditions. J Periodontol 2018, 89 Suppl 1, S74-S84. DOI: 10.1002/JPER.17-0719.
84. Delak, K.; Harcup, C.; Lakshminarayanan, R.; Sun, Z.; Fan, Y.; Moradian-Oldak, J.; Evans, J. S., The tooth enamel protein, porcine amelogenin, is an intrinsically disordered protein with an extended molecular configuration in the monomeric form. Biochemistry 2009, 48 (10), 2272-81. DOI: 10.1021/bi802175a.
85. Lacruz, R. S.; Lakshminarayanan, R.; Bromley, K. M.; Hacia, J. G.; Bromage, T. G.; Snead, M. L.; Moradian-Oldak, J.; Paine, M. L., Structural analysis of a repetitive protein sequence motif in strepsirrhine primate amelogen in. PLoS One 2011, 6 (3), e18028. DOI: 10.1371/journal.pone.0018028.
86. Wald, T.; Osickova, A.; Sulc, M.; Benada, O.; Semeradtova, A.; Rezabkova, L.; Veverka, V.; Bednarova, L.; Maly, J.; Macek, P.; Sebo, P.; Slaby, I.; Vondrasek, J.; Osicka, R., Intrinsically disordered enamel matrix protein ameloblastin forms ribbon-like supramolecular structures via an N-terminal segment encoded by exon 5. J Biol Chem 2013, 288 (31), 22333-45. DOI: 10.1074/jbc.M113.456012.

87. Lamiable, A.; Thevenet, P.; Rey, J.; Vavrusa, M.; Derreumaux, P.; Tuffery, P., PEP-FOLD3: faster de novo structure prediction for linear peptides in solution and in complex. Nucleic Acids Res 2016, 44 (W1), W449-54. DOI: 10.1093/nar/gkw329.
88. Wimley, W. C., Describing the Mechanism of Antimicrobial Peptide Action with the Interfacial Activity Model. ACS Chemical Biology 2010, 5 (10), 905-917. DOI: 10.1021/cb1001558.
89. Pettersen, E. F.; Goddard, T. D.; Huang, C. C.; Couch, G. S.; Greenblatt, D. M.; Meng, E. C.; Ferrin, T. E., UCSF Chimera—a visualization system for exploratory research and analysis. J Comput Chem 2004, 25 (13), 1605-12. DOI: 10.1002/jcc.20084.
90. Kabsch, W.; Sander, C., Dictionary of protein secondary structure: pattern recognition of hydrogen-bonded and geometrical features. Biopolymers 1983, 22 (12), 2577-637. DOI: 10.1002/bip.360221211.
91. Boone, K.; Camarda, K.; Spencer, P.; Tamerler, C., Antimicrobial peptide similarity and classification through rough set theory using physicochemical boundaries. BMC Bioinformatics 2018, 19, 469. DOI: https://doi.org/10.1186/s12859-018-2514-6.
92. Socransky, S. S.; Haffajee, A. D., The bacterial etiology of destructive periodontal disease: current concepts. J Periodontol 1992, 63 (4 Suppl), 322-31.
93. Haffajee, A. D.; Socransky, S. S., Microbial etiological agents of destructive periodontal diseases. Periodontol 2000 1994, 5, 78-111.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A bifunctional peptide of amino acid sequence (SEQ ID NO: 1)
RPRENRGRERGLGSGGGKWKLWKKIEKWGQGIGAVLKWLTTW or one or both of a pharmaceutically acceptable salt thereof and a solvate thereof.

2. A composition comprising a bifunctional peptide of claim 1 and a pharmaceutically acceptable carrier.

3. A method of treating peri-implant disease in a subject in need thereof, the method comprising administering an effective amount of a bifunctional peptide of claim 1 to a dental implant in the subject.

4. The method of claim 3, wherein the peri-implant disease is peri-implantitis.

5. A method of controlling bacterial colonization on a dental implant in a subject, the method comprising administering to the dental implant an effective amount of a bifunctional peptide of claim 1.

6. A method to control biofilm formation on a dental implant in a subject, the method comprising administering to the dental implant an effective amount of the peptide of a bifunctional peptide of claim 1.

* * * * *